(12) United States Patent
Cheng et al.

(10) Patent No.: US 9,871,379 B2
(45) Date of Patent: Jan. 16, 2018

(54) SMART MICROGRIDS AND DUAL-OUTPUT OFF-GRID POWER INVERTERS WITH DC SOURCE FLEXIBILITY

(71) Applicant: CyboEnergy, Inc., Rancho Cordova, CA (US)

(72) Inventors: George Shu-Xing Cheng, Folsom, CA (US); Steven L. Mulkey, Cameron Park, CA (US); Andrew J. Chow, Sacramento, CA (US)

(73) Assignee: CYBOENERGY, INC., Rancho Cordova, CA (US)

( * ) Notice: Subject to any disclaimer, the term of this patent is extended or adjusted under 35 U.S.C. 154(b) by 211 days.

(21) Appl. No.: 14/625,375

(22) Filed: Feb. 18, 2015

(65) Prior Publication Data
US 2016/0241039 A1 Aug. 18, 2016

(51) Int. Cl.
*H02J 7/35* (2006.01)
*H02M 7/44* (2006.01)
*H02J 3/38* (2006.01)

(52) U.S. Cl.
CPC .............. *H02J 3/383* (2013.01); *H02J 3/386* (2013.01); *H02J 3/387* (2013.01); *H02J 7/35* (2013.01); *H02M 7/44* (2013.01)

(58) Field of Classification Search
CPC .... H02J 3/00; H02J 3/383; H02J 3/386; H02J 3/387; H02J 7/35; H02J 9/06; H02M 7/44
USPC .................. 307/38, 65; 363/71, 24
See application file for complete search history.

(56) References Cited

U.S. PATENT DOCUMENTS

| | | | | |
|---|---|---|---|---|
| 4,697,136 A * | 9/1987 | Ishikawa | .......... | H02J 1/10 136/293 |
| 2006/0208574 A1* | 9/2006 | Lasseter | .......... | H02J 3/38 307/69 |
| 2010/0001587 A1* | 1/2010 | Casey | .......... | H01L 31/02021 307/80 |
| 2010/0156189 A1* | 6/2010 | Fishman | .......... | H02J 3/36 307/77 |
| 2011/0115294 A1* | 5/2011 | Gallegos-Lopez | ..... | H02M 1/10 307/52 |
| 2011/0273015 A1* | 11/2011 | Adest | .......... | H01L 31/02021 307/43 |
| 2012/0175955 A1* | 7/2012 | Carralero | .......... | H02J 3/381 307/38 |
| 2012/0175964 A1* | 7/2012 | Yoscovich | .......... | H02J 3/383 307/82 |

(Continued)

*Primary Examiner* — Jared Fureman
*Assistant Examiner* — Win Htun
(74) *Attorney, Agent, or Firm* — Donald E. Stout; Stout, Uxa & Buyan, LLP

(57) ABSTRACT

A method and apparatus is disclosed relating to smart microgrids supported by dual-output off-grid power inverters with DC source flexibility that can (1) intelligently and selectively pull power from one or multiple DC sources including solar panels, wind generators, and batteries based on certain criteria; (2) invert DC power to AC power; (3) supply the AC power to two off-grid circuits individually to power various types of AC loads that require different AC voltages, power quality, and power levels; (4) supply DC power through one or multiple DC output ports to power DC loads; and (5) charge batteries. Two or multiple dual-output off-grid power inverters can daisy-chain to form a group to support a larger microgrid which is ideal for off-grid AC Level 1 and Level 2 EV charging.

24 Claims, 11 Drawing Sheets

(56) References Cited

U.S. PATENT DOCUMENTS

| | | | | |
|---|---|---|---|---|
| 2012/0313443 A1* | 12/2012 | Cheng | ............... | H02J 3/383 307/82 |
| 2014/0168835 A1* | 6/2014 | Fornage | ............... | H02H 7/20 361/57 |
| 2014/0265585 A1* | 9/2014 | Della Sera | ............... | H02J 3/38 307/52 |

* cited by examiner

SMART MICROGRIDS AND DUAL-OUTPUT OFF-GRID POWER INVERTERS WITH DC SOURCE FLEXIBILITY

INVENTION

The subject of this patent relates to smart microgrids and off-grid power inverters that invert DC (direct current) power from single or multiple DC sources to single-phase or three-phase AC (alternating current) power, where the DC sources include but are not limited to photovoltaic (PV) solar modules or panels, PV cells, PV materials, PV thin films, fuel cells, batteries, wind generators, bio-fuel generators, and other DC power generators. More particularly, this patent relates to smart microgrids supported by dual-output off-grid power inverters with DC source flexibility that can (1) intelligently and selectively pull power from one or multiple DC sources based on certain criteria; (2) invert DC power to AC power; (3) supply the AC power to one of the two off-grid circuits to power different types of AC loads; (4) supply DC power through one or multiple DC output ports to power DC loads; and (5) charge batteries. In addition, two or multiple off-grid power inverters can daisy-chain to form a group to support a larger microgrid. The dual-output functions and the DC source selection criteria are implemented in computer software, which is configurable to achieve desirable functions for a specific application.

In the U.S. Pat. No. 8,786,133, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application Ser. No. 13/493,622, the entirety of which is hereby incorporated by reference, we described the Smart and Scalable Off-Grid Mini-Inverters having one or multiple DC input channels that can invert DC power to AC power, and supply AC power to power electrical devices including motors, pumps, fans, lights, appliances, and homes.

In the U.S. patent application Ser. No. 13/537,206, the entirety of which is hereby incorporated by reference, we described an enclosure design to accommodate and support the unique features and capabilities of the Smart and Scalable Power Mini-Inverters that have multiple input channels, and a messaging system using LEDs mounted on the enclosure to indicate the system status of the Smart and Scalable Mini-Inverters.

In the U.S. patent application Ser. No. 13/789,637, the entirety of which is hereby incorporated by reference, we described a method and apparatus for maximizing power production for solar power systems when there is low sunlight during sunrise, sunset, clouding, partial shading, and other low irradiance conditions. A multiple-channel solar power Mini-Inverter can work in the low power mode when there is low sunlight, take power from one solar module to supply DC power to its internal electronic circuits, and also invert the DC power from the remaining connected solar modules to AC power feeding to the electric grid or powering AC loads.

In the U.S. patent application Ser. No. 13/844,484, the entirety of which is hereby incorporated by reference, we described a method and apparatus that can monitor the solar power inverters in real-time both day and night, and generate surveillance alarms and actions when a solar power inverter is removed or disconnected from the AC powerline for no good reason. It offers a low cost and reliable surveillance means to help guard a residential-scale, commercial-scale, or utility-scale solar system in real-time at all times.

In the U.S. patent application Ser. No. 13/846,708, the entirety of which is hereby incorporated by reference, we described a method and apparatus for solar power generation when irradiance changes quickly or is very low due to sunrise, sunset, clouding, partial shading, warped PV surfaces, moving solar modules, and other low or varying irradiance conditions. A multi-channel solar power inverter connected to multiple solar modules can work in a "Lunar Power Mode", inverting DC power induced from the sky, street lights, or surrounding environment to AC power.

In the U.S. patent application No. 62/087,644, the entirety of which is hereby incorporated by reference, we described a method and apparatus that can intelligently invert DC power from single or multiple DC sources to single-phase or three-phase AC power, supply the AC power to the electric power grid when the grid is on, or supply AC power to electric devices or loads when the grid is down. A Smart and Grid flexible Power Inverter, or On/Off-Grid Power Inverter, is disclosed that can work in either the on-grid or off-grid mode, and switch back and forth between the two modes manually or automatically depending on the power grid conditions.

In the U.S. patent application No. 62/109,427, the entirety of which is hereby incorporated by reference, we described a smart renewable power generation system with grid and DC source flexibility that can (1) intelligently and selectively pull power from one or multiple DC sources based on certain criteria; (2) invert DC power to AC power; (3) supply the AC power to the electric grid or to an off-grid electric circuit to power AC loads; (4) supply DC power through one or multiple DC output ports to power DC loads; and (5) charge batteries. Various types of on-grid, off-grid, and on/off-grid DC flexible power inverters are described to demonstrate the innovation for delivering flexible, cost-effective, and user-friendly power generation systems to harvest any form of renewable energy available and convert it to usable electricity.

In this patent, we disclose smart microgrids and dual-output off-grid power inverters with DC source flexibility. In the accompanying drawing.

Figure 9:
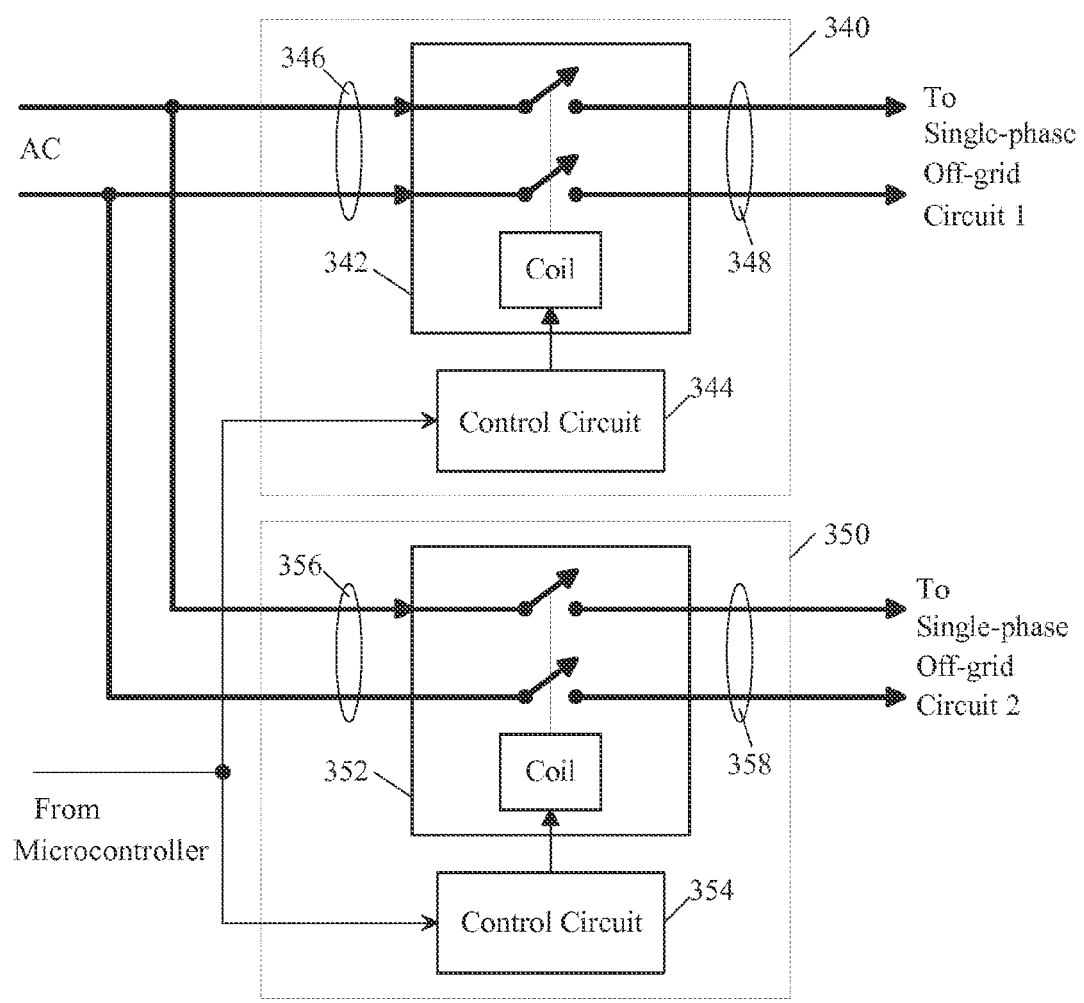

FIG. 9 is a block diagram illustrating a dual-output off-grid power inverter's output port 1 to supply power to single-phase type 1 AC loads, and output port 2 to supply power to single-phase type 2 AC loads, according to an embodiment of this invention.

Figure 10:
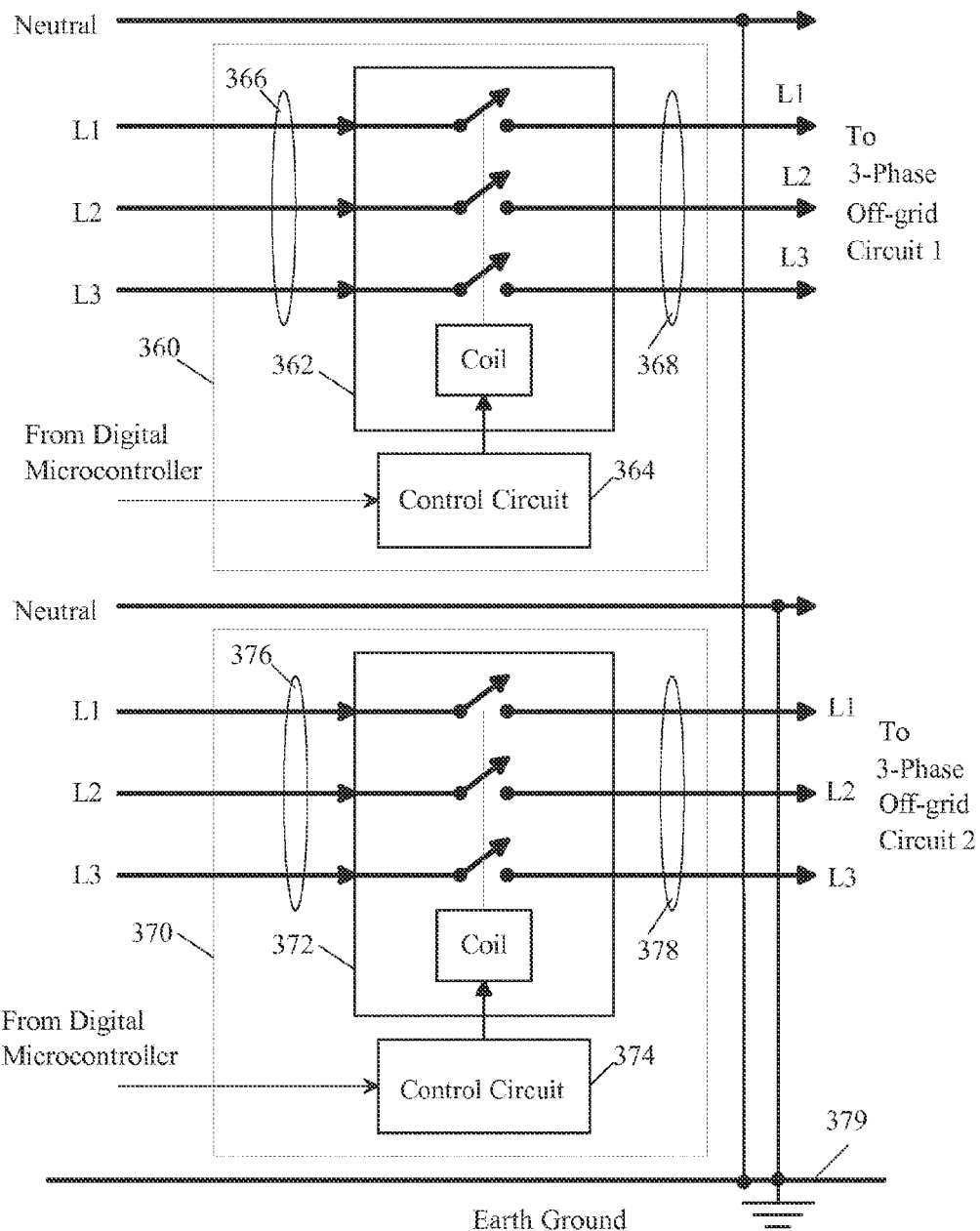

FIG. 10 is a block diagram illustrating a dual-output off-grid power inverter's output port 1 to supply power to three-phase type 1 AC loads, and output port 2 to supply power to three-phase type 2 AC loads, according to an embodiment of this invention.

Figure 11:
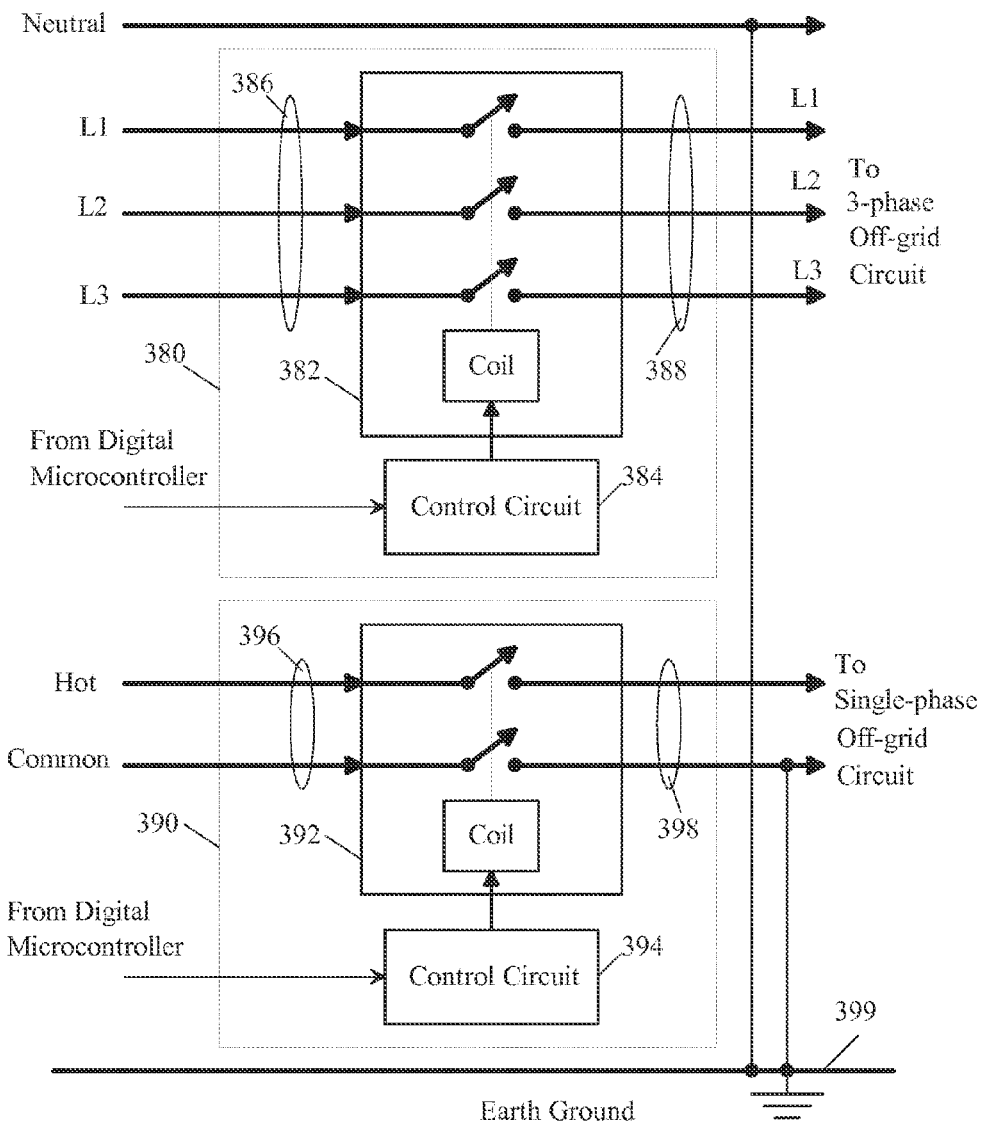

FIG. 11 is a block diagram illustrating a dual-output off-grid power inverter's output port 1 to supply power to single-phase AC loads, and output port 2 to supply power to three-phase AC loads, according to an embodiment of this invention.

Figure 12:
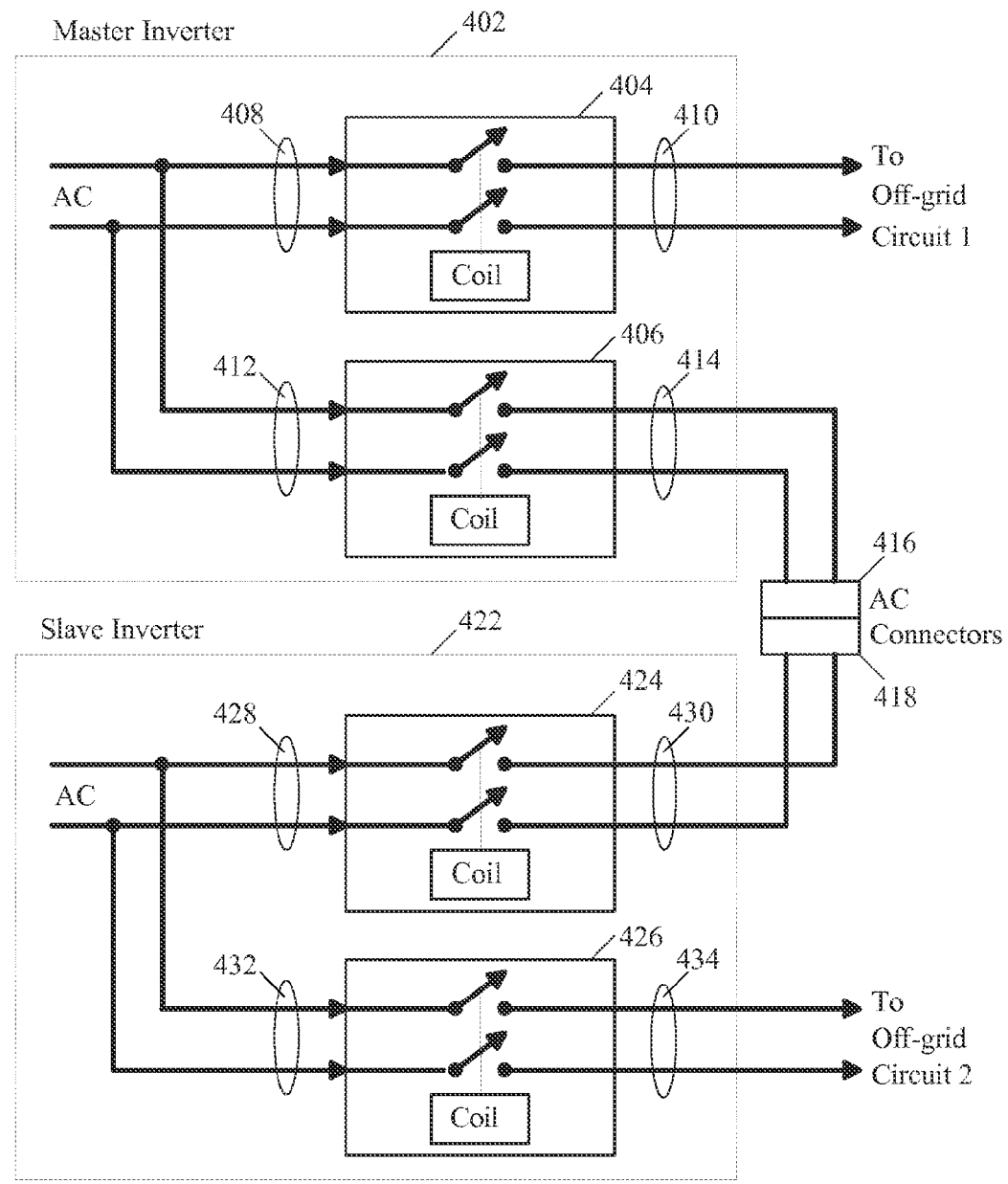

FIG. 12 is a block diagram illustrating the output ports of a dual-output off-grid master inverter and slave inverter, where the two inverters daisy-chain through their corresponding output ports to form a group and supply power to an off-grid AC circuit 1 or an off-grid AC circuit 2, according to an embodiment of this invention.

The term "mechanism" is used herein to represent hardware, software, or any combination thereof. The term "solar panel" or "solar module" refers to photovoltaic (PV) solar modules. The term "AC load" is used herein to represent one or more single-phase or three-phase electrical devices including but not limited to motors, pumps, fans, lights, appliances, and homes.

Throughout this document, m=1, 2, 3, . . . , as an integer, which is used to indicate the number of the DC input ports of an inverter. The term "input channel" refers to the DC input port of the inverter. Then, an m-channel inverter means that the inverter has m input channels or m DC input ports. The term "m-channel inverter" refers to an inverter that has m input channels, where m=1, 2, 3, . . . , as an integer.

Throughout this document, a DC source can be in any one of the following forms including a solar panel or a set of solar panels combined in series and/or parallel, a battery or a set of batteries combined in series and/or parallel, a fuel cell or a set of fuel cells combined in series and/or parallel, a wind generator, and other types of DC power generators.

Throughout this document, if a power inverter is used to generate single-phase AC, it can also be applied to three-phase AC without departing from the spirit or scope of our invention. If a solar inverter is used to generate three-phase AC, it can also be applied to single-phase AC without departing from the spirit or scope of our invention. The AC power and related electric grid and AC load can be either single-phase, split-phase, or three-phase.

Without losing generality, all numerical values given in this patent are examples. Other values can be used without departing from the spirit or scope of our invention. The description of specific embodiments herein is for demonstration purposes and in no way limits the scope of this disclosure to exclude other not specially described embodiments of this invention.

DESCRIPTION

Microgrids are emerging as a credible threat to the dominance of the traditional electric power monopoly. Off-grid power systems, once used as a backup for power blackouts, are now gaining rapid adoption from homeowners to large-operation customers for daily use. Similar to mobile phones replacing wired phones, off-grid power systems or microgrids can also leap over traditional power grids and provide power to rural parts of the world where billions of people are living without electricity.

Most off-grid power inverters on the market have to take input DC power from batteries making the system more complex and less efficient. In our view, battery usage should be minimized because batteries are not clean tech products and the microgrids should not be built based on batteries.

In this patent, we disclose smart microgrids and dual-output off-grid power inverters with DC source flexibility that overcome the shortcomings of traditional off-grid power systems.

Figure 1:
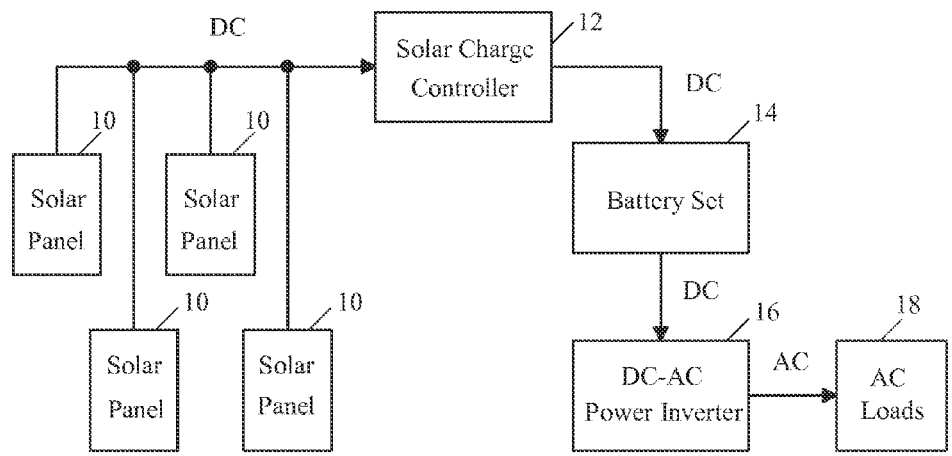
FIG. 1 is a block diagram illustrating a traditional off-grid solar power system as prior art, where the battery is a necessary component of the system.

FIG. 1 is a block diagram illustrating a traditional off-grid solar power system, as prior art, where the battery is a necessary component of the system. The system comprises multiple solar panels 10, a solar charge controller 12, a single battery or a battery set 14, a DC-AC power inverter 16, and AC loads 18.

A battery set is a set of batteries that are connected in parallel and/or in series to provide higher DC voltage and current. For instance, three 12V batteries can be connected in series to become a 36V battery. The solar panels are combined in series and/or parallel to supply DC power to the solar charge controller which connects to the battery set for charging. The solar charge controller takes DC power from the solar panels and charges the batteries. The DC-AC power inverter takes DC power from the battery set, inverts the DC to AC power, and outputs AC to power the AC loads.

Figure 2:
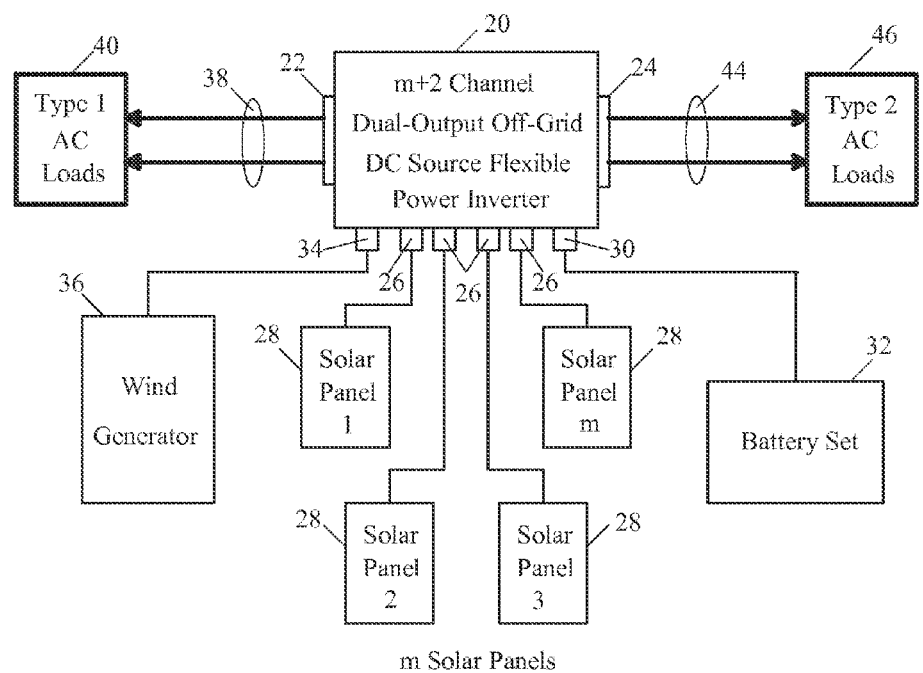
FIG. 2 is a block diagram illustrating a smart microgrid where one m+2 channel dual-output off-grid DC source flexible power inverter has two off-grid AC output ports, according to an embodiment of this invention.

FIG. 2 is a block diagram illustrating a smart microgrid where one m+2 channel dual-output off-grid DC source flexible power inverter has two off-grid AC output ports, according to an embodiment of this invention.

The microgrid comprises a m+2 channel dual-output off-grid DC flexible power inverter 20, an inverter's off-grid AC power output port 22 that is connected to type 1 AC loads 40 via AC powerline 38, an inverter's off-grid AC power output port 24 that is connected to type 2 AC loads 46 via AC powerline 44, inverter's multiple DC input channels 26 that connect to m solar panels 28, respectively, an inverter's battery input channel 30 that connects to a battery set 32, and an inverter's wind power input channel 34 that connects to a wind generator 36.

In the embodiments herein, the dual-output power inverter connects to an off-grid AC circuit 1 for type 1 AC loads via its AC output port 1. The same inverter connects to an off-grid AC circuit 2 for type 2 AC loads via its AC output port 2. The inverter supplies AC power to off-grid circuit 1 when working in off-grid mode 1, and supplies AC power to off-grid circuit 2 when working in off-grid mode 2.

A type 1 AC load can be different than a type 2 AC load in required voltage or power quality. They can even be similar loads but connected to either the off-grid circuit 1 or 2. For instance, a type 1 AC load is an electric water heater or a heating element that requires 100V to 240V AC to operate; and type 2 AC loads are lights, fans, TVs, computers, and battery chargers that require 120V pure-sinewave AC.

As another example, the Society of Automotive Engineers (SAE) published SAE J1772, a standard for all North American electrical connectors for electric vehicle (EV) charging. The standard specifies that a Level 1 EV charger takes 120V AC power and a Level 2 EV charger takes 240V AC power. In this regard, the Level 1 EV charger is a type 1 AC load, and the Level 2 EV charger is a type 2 AC load.

In FIG. 2, the dual-output off-grid DC flexible power inverter can (1) intelligently and selectively pull power from the solar panels, wind generator, and battery based on certain criteria; (2) invert DC power from one or multiple DC sources to AC power; (3) supply the AC power to either type 1 or 2 AC loads; and (4) charge the battery, if the power provided by the solar panels and wind generator is sufficient and the battery is below a pre-determined level.

Without losing generality, the dual-output off-grid power inverter and the one to be described in FIG. 3 can be designed to work in the following ways:

(1) When the inverter starts, it will send a test signal to check the off-grid circuit 1. If there is no AC present and an AC load is detected, it will start to generate AC to power the load. Now, the inverter is working in off-grid mode 1.

(2) When the off-grid circuit 1 is disconnected, the inverter will stop generating power and send a test signal to check the off-grid circuit 2. If there is no AC present and an AC load is detected, it will start to generate AC to power the load. Now, the inverter is working in off-grid mode 2.

(3) When the off-grid circuit 2 is disconnected, the inverter will stop generating power and go back to send a test signal to check the off-grid circuit 1. If there is no AC present and an AC load is detected, it will start to generate AC to power the load again. Now, the inverter is working in off-grid mode 1. Otherwise, it will go back and check the circuit 2 and so on.

(4) If both off-grid circuits 1 and 2 do not meet the power generation requirements, the inverter will not generate power but will continue to check the two off-grid circuits.

As a case example, a smart microgrid comprises the following: (1) an off-grid circuit 1 connected with an electric water heater as a type 1 AC load requiring 240V AC, and (2) an off-grid circuit 2 connected with lights and a computer as type 2 AC loads requiring 120V AC. When the inverter starts, it will supply power to heat the water. When the water temperature reaches its setpoint, the water heater thermostat will disconnect the off-grid circuit 1. The inverter then will check the off-grid circuit 2 and start to power the lights and the computer. The user can manually switch the lights and computer off so that the off-grid circuit 2 is disconnected from its loads. In this case, the inverter will go back to check the water heater status. If the water temperature is below its setpoint, the inverter will send power to heat the water again. If the water temperature is still within the setpoint range, the inverter will enter its idle mode generating no power but continually checking the status for both off-grid circuits.

As another example, the dual-output off-grid power inverter can support two off-grid circuits that can be a distance from each other. For instance, off-grid circuit 1 can be located in the living room to power lights, fans, and a TV. Off-grid circuit 2 can be located in the kitchen to power lights, a microwave, and cookware. This is another useful feature of a dual-output off-grid power inverter.

The off-grid output ports and switching circuits of dual-output off-grid power inverters will be described in FIGS. 9 to 12.

In the embodiments herein, the solar panel can be a silicon or thin film type photovoltaic (PV) solar panel or a set of solar panels combined in series and/or parallel; the battery can be a lead-acid, Lithium-Ion, fuel-cell, or other type of battery or a set of batteries combined in series and/or parallel; the wind generator can be any type of wind generators that produce DC power or an AC wind generator whose AC output can be converted to DC using a rectifier device. The wind generator should have over-speed protection mechanism and produce DC power with appropriate voltage, current, and wattage. The AC power and related electric grid as well as AC loads can be single-phase, split-phase, or three-phase. The 2 AC wires 38 and 44 in FIG. 2 and in the other embodiments to be described in this patent are used to show the concept and method.

Figure 3:
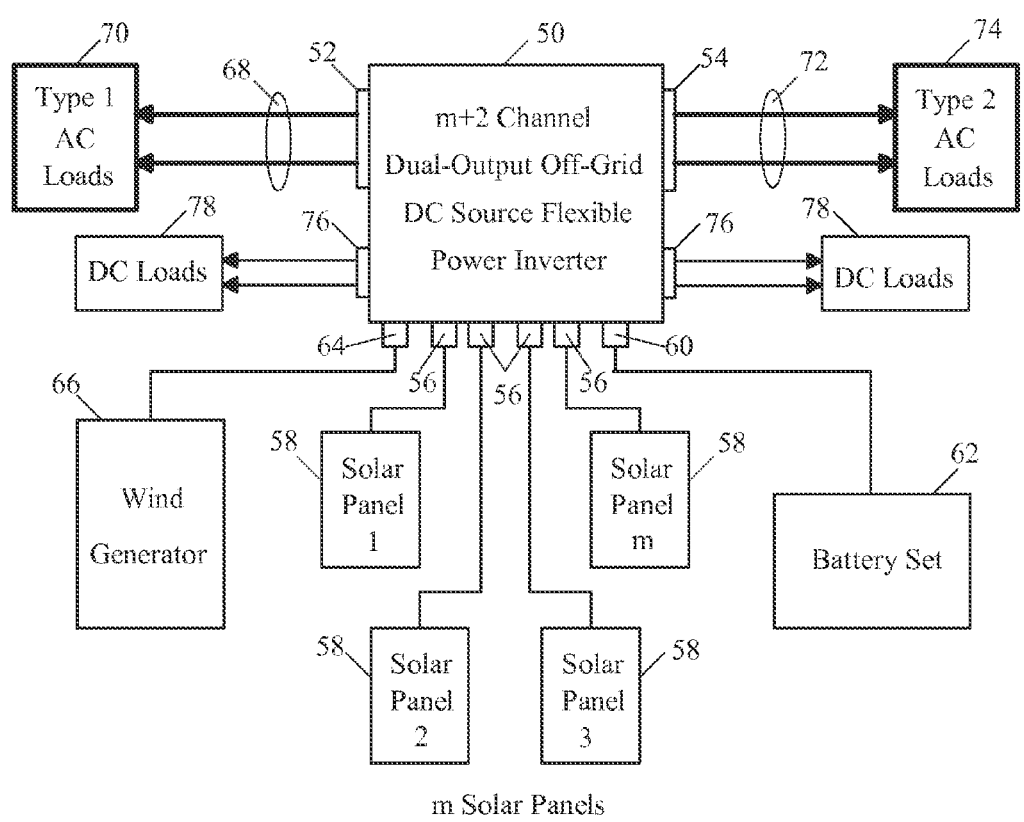
FIG. 3 is a block diagram illustrating a smart microgrid where one m+2 channel dual-output off-grid DC source flexible power inverter has two off-grid AC output ports and two DC output ports, according to an embodiment of this invention.

FIG. 3 is a block diagram illustrating a smart microgrid where one m+2 channel dual-output off-grid DC source flexible power inverter has two off-grid AC output ports and two DC output ports, according to an embodiment of this invention.

The microgrid comprises a m+2 channel dual-output off-grid DC source flexible power inverter 50, an inverter's off-grid AC power output port 52 that is connected to type 1 AC loads 70 via AC powerline 68, an inverter's off-grid AC power output port 54 that is connected to type 2 AC loads 74 via AC powerline 72, two inverter's DC output ports 72 that connect to DC loads 78, respectively, inverter's multiple DC input channels 56 that connect to m solar panels 58, respectively, an inverter's battery input channel 60 that connects to a battery set 62, and an inverter's wind power input channel 64 that connects to a wind generator 66.

In this system, the dual-output off-grid DC flexible power inverter can (1) intelligently and selectively pull power from the solar panels, wind generator, and battery based on certain criteria; (2) invert DC power from one or multiple DC sources to AC power; (3) supply the AC power to power either type 1 or type 2 AC loads; (4) supply DC power through DC output ports to power the DC loads; and (5) charge the battery, if the power provided by the solar panels and wind generator is sufficient and the battery is below a pre-determined level.

In the embodiments herein, a smart microgrid supported by power inverters with DC source flexibility should include the following functions: (1) pull all available DC power from all solar panels at the maximum power point (MPP); (2) charge the battery if there is excess DC power from the solar panels and/or wind generators; (3) be able to select and pull power from available DC sources based on certain criteria; (4) be able to combine all available DC power from solar, wind, and battery to meet the demand from all AC and DC loads in the microgrid; and (5) implement the DC source selection criteria in software that is configurable to achieve desirable functions for a specific application.

The DC source selection criteria can be designed with the following options: (1) maximize the harvest of solar and wind energy and supply the converted AC power to power either type 1 or type 2 AC loads; (2) provide sufficient AC and DC power to run the connected AC and DC loads without using the battery power; (3) if solar and wind cannot produce sufficient DC power for the system to run the connected AC and DC loads, pull power from the battery to meet the power demand; (4) charge battery if there is sufficient wind power which enters the charge controller directly; (5) charge battery if there is excess DC power from solar and/or wind; and (6) pull power from all DC sources to produce the AC power needed to start heavy loads such as compressors and motors.

The essence of the DC source selection criteria is about balancing the input and output power, while achieving the defined objectives. The criteria is implemented in the software running in a digital microcontroller in the power inverter to be described in FIGS. 6 to 8. To determine the DC input power and AC output power, voltage and current sensors for both DC inputs and AC output are installed in the inverter. Power is calculated by multiplying voltage and current. The digital microcontroller uses the DC input and AC output power information to balance the input and output power.

Compared with the off-grid solar power system in FIG. 1, the smart microgrids described in FIGS. 2 and 3 have many features and benefits including: (1) the battery is not a necessary component for the system to be operational so that battery-less off-grid power generation systems can be implemented; (2) when there is sufficient sunlight or wind, the inverter will pull power from the solar panels and/or wind generator to run the AC and DC loads, while leaving the battery idle to extend its life; (3) the battery is charged if there is sufficient DC power from the solar panels or wind generator; (4) battery power can be pulled when more DC power is needed to run the connected AC and DC loads; (5) supply AC power to either type 1 or 2 AC loads, and (6) supply DC power to DC loads including battery chargers, lights, tools, instruments, DC pumps, DC motors, and other electric devices that require DC to operate.

In addition, the dual-outputs of each inverter allows the microgrids to separate AC loads based on their required power wattage and quality. For instance, the smart microgrid has two off-grid circuits with the following design options:

(1) Based on required power wattage, circuit 1 supports a heavy load such as an air conditioner that requires a lot of power to run, and circuit 2 supports the smaller loads such as lights, fans, etc.

(2) Based on required power quality, circuit 1 has a heavy load that can distort the AC waveform, and circuit 2 has more sensitive loads such as a TV, computer, and phone charger that require pure sinewave AC.

Figure 4:
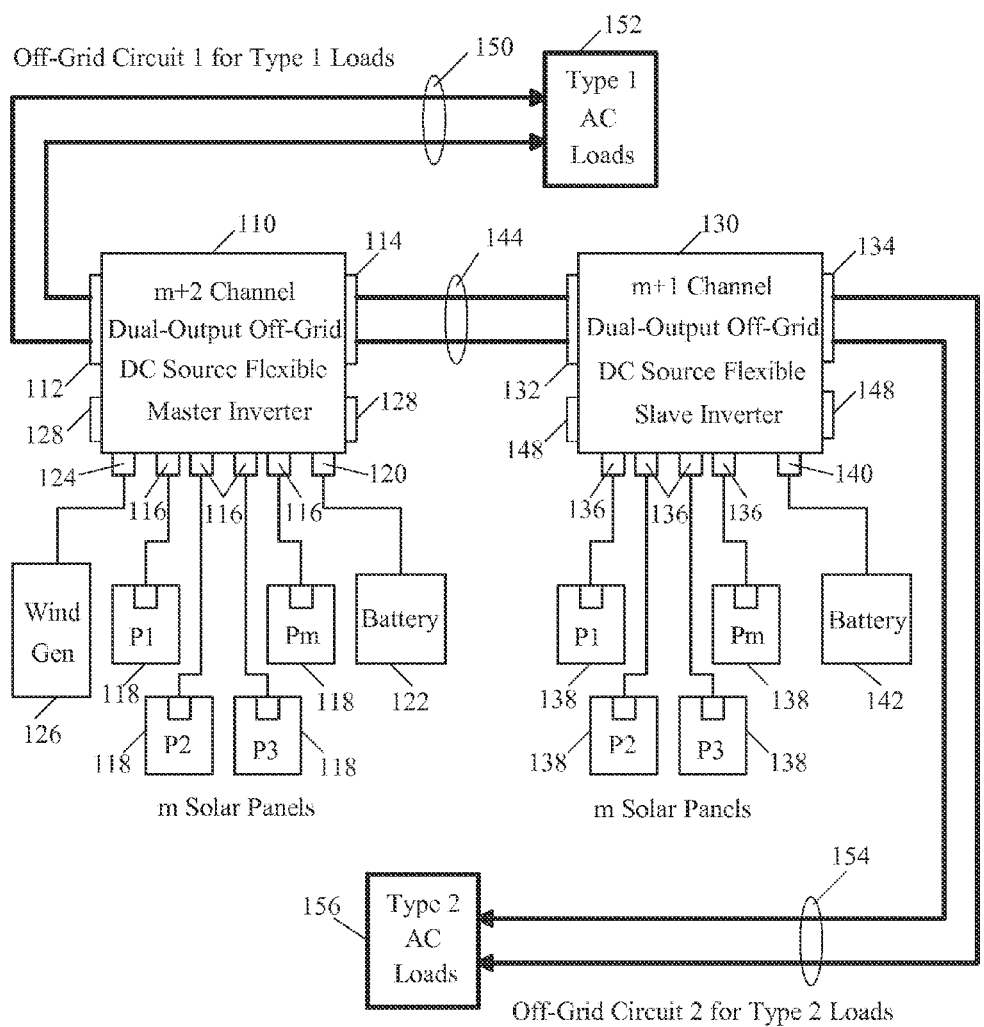
FIG. 4 is a block diagram illustrating a smart microgrid where one m+2 channel and one m+1 channel dual-output off-grid DC flexible power inverters daisy-chain to form a group, each inverter has two AC output ports and two DC output ports, according to an embodiment of this invention.

FIG. 4 is a block diagram illustrating a smart microgrid where one m+2 channel and one m+1 channel dual-output off-grid DC flexible power inverters daisy-chain to form a group, each inverter has two AC output ports and two DC output ports, according to an embodiment of this invention.

The microgrid comprises one m+2 channel dual-output off-grid DC source flexible master inverter 110, which has (1) m DC input channels 116 that are connected to m solar panels 118, respectively, (2) a battery channel 120 that is connected to a battery set 122, and (3) a wind channel 124 that is connected to a wind generator 126. The microgrid also comprises a m+1 channel dual-output off-grid DC source flexible slave inverter 130, which has (1) m DC input channels 136 that are connected to m solar panels 138, respectively, and (2) a battery channel 140 that is connected to a battery set 142. Notice that the m+1 channel slave inverter does not include a wind channel in this case. There can be numerous combination possibilities where different power inverters in the same family can be combined to form a group.

In this microgrid, the m+2 channel dual-output master inverter 110 comprises an AC output port 112 that connects to type 1 AC loads 152 via off-grid circuit 150, and an AC output port 114 for type 2 AC loads. The m+1 channel dual-output slave inverter 130 comprises an AC output port 132 for type 1 AC loads, and an AC output port 134 that connects to type 2 AC loads 156 via off-grid circuit 154. The two inverters daisy-chain by connecting the AC output port 114 of inverter 110 to the AC output port 132 of inverter 130 via AC powerline 144. Although we say the inverters daisy chain, the actual connection of the inverters is pass-through. That means, the generated AC power from each power inverter is added in parallel onto the AC powerline.

In physical design, in order to allow the dual-output master and slave inverters to daisy-chain, the AC output port 114 of the master inverter 110 can use a female-type AC connector, and the AC output port 132 of the slave inverter 130 can use a male-type AC connector. Since these 2 connectors make a matching pair, the user can easily make the AC connections and avoid potential errors.

The smart and scalable off-grid power inverters have been described in the U.S. patent application Ser. No. 13/493,622, where multiple off-grid inverters can work together as a group, in which an AC master inverter is the "leading inverter" to generate AC power to the off-grid AC powerline to allow the other off-grid slave inverters connected to the same AC powerline to synchronize with the AC power being produced by the master inverter. A microgrid can have only one master inverter but multiple slave inverters.

In FIG. 4, the m+2 channel off-grid inverter 110 is the master inverter and the m+1 channel off-grid inverter 130 is a slave inverter. Since both the master and slave inverters are dual-output inverters that have 2 AC output ports, they can be arranged to work together in the following ways:

(1) Each inverter can take DC power from its corresponding DC sources based on certain criteria and invert the DC power to AC power.

(2) When the master inverter starts, it will send a test signal through its output port 112 to check the off-grid circuit 1. If there is no AC present and an AC load is detected, it will start to generate AC to power the load. When the slave inverter sees a leading AC waveform, it will start to generate power and its generated AC is synchronized with the leading AC waveform. Both inverters work together to regulate the AC voltage within the rated AC output voltage for the type 1 AC loads in off-grid circuit 1. Now, both inverters work in off-grid mode 1.

(3) When the off-grid circuit 1 is disconnected, both inverters will stop generating power. The master inverter will send a test signal through AC powerline 144 and the output port 134 of the slave inverter 130 to check the off-grid circuit 2. If there is no AC present and an AC load is detected, the master inverter will start to generate AC to power the load in the off-grid circuit 2. When the slave inverter sees a leading AC waveform, it will start to generate AC power which is synchronized with the leading AC waveform. Both inverters work together to regulate the AC voltage within the rated AC output voltage for the type 2 AC loads in off-grid circuit 2. Now, both inverters work in off-grid mode 2.

(4) When the off-grid circuit 2 is disconnected, both inverters will stop generating power and the master inverter will go back and send a test signal to check the off-grid circuit 1. If there is no AC present and an AC load is detected, both inverters will start to generate AC to power the type 1 load again. Now, both inverters work in off-grid mode 1. Otherwise, the master inverter will go back and check the circuit 2 and so on.

(5) If both off-grid circuits 1 and 2 do not meet the power generation requirements, the inverters will not generate power and the master inverter will continue to check the status for both off-grid circuits.

The detailed design to allow the dual-output off-grid master inverter and dual-output off-grid slave inverter to work together will be illustrated and described in FIG. 12.

Figure 5:
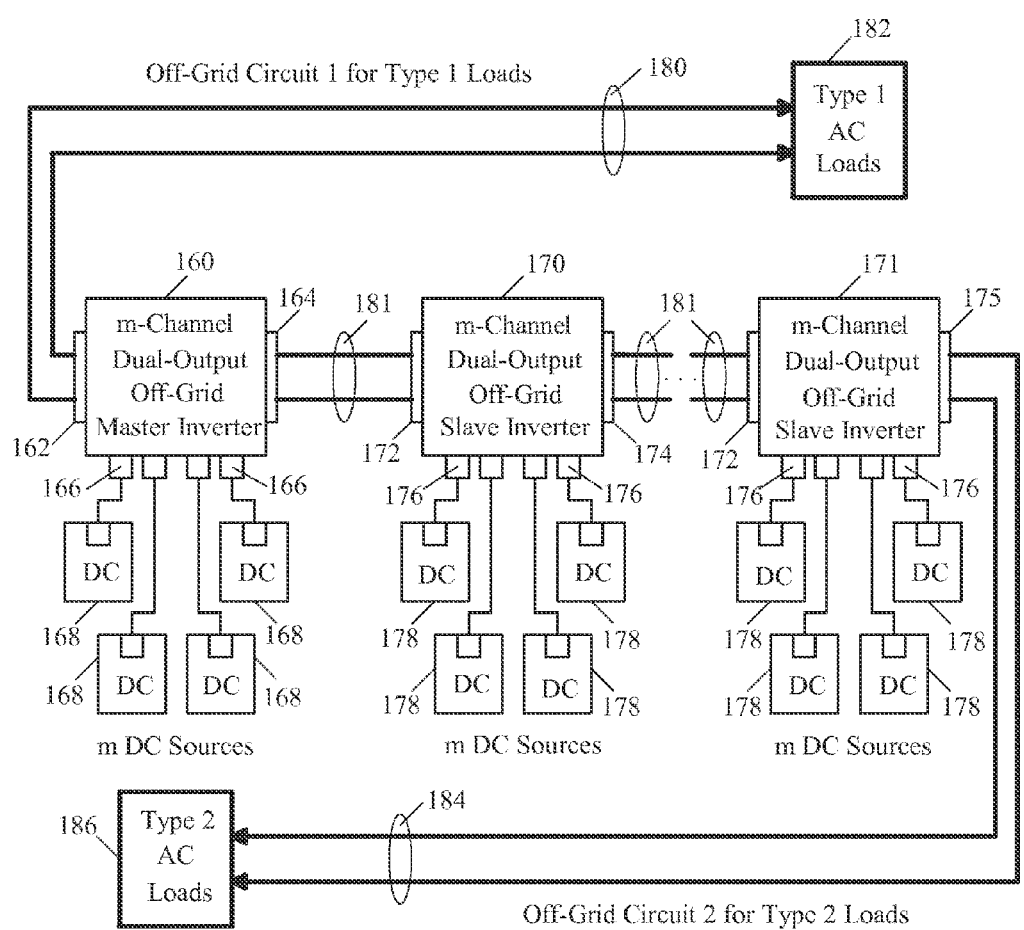
FIG. 5 is a block diagram illustrating a smart microgrid where multiple m-channel dual-output off-grid power inverters work together to form a group, each inverter has two AC output ports, according to an embodiment of this invention.

FIG. 5 is a block diagram illustrating a smart microgrid where multiple m-channel dual-output off-grid power inverters work together to form a group, each inverter has two AC output ports, according to an embodiment of this invention.

Without losing generality, the system comprises one m-channel dual-output off-grid master inverter 160 and multiple m-channel dual-output off-grid slave inverters 170, 171. The master inverter 160 has m DC input channels 166 that are connected to m DC sources 168, respectively. Each slave inverter 170 or 171 has m DC input channels 176 that are connected to m DC sources 178, respectively.

In this microgrid, the dual-output master inverter 160 comprises an AC output port 162 that connects to type 1 AC loads 182 via off-grid circuit 180, and an AC output port 164 for type 2 AC loads. Each dual-output slave inverter 170 comprises an AC output port 172 for type 1 AC loads, and an AC output port 174 for type 2 AC loads. There can be one or multiple slave inverters 170. The last slave inverter 171 has an AC output port 175 that connects to type 2 AC loads 186 via off-grid circuit 184. All inverters 160, 170, and 171 daisy-chain by connecting their corresponding AC output ports through AC powerline 181 as illustrated in FIG. 5. Although we say the inverters daisy chain, the actual connection of the inverters is pass-through. That means, the generated AC power from each power inverter is added in parallel onto the AC powerline.

The dual-output master inverter and slave inverters can be arranged to work together in the following ways:

(1) Each inverter can take DC power from its corresponding DC sources based on certain criteria and invert the DC power to AC power.

(2) When the master inverter 160 starts, it will send a test signal through its output port 162 to check the off-grid circuit 1 for type 1 AC loads. If there is no AC present and an AC load is detected, it will start to generate AC to power the load. When the slave inverters 170 and 171 see a leading AC waveform, they will start to generate power and the generated AC is synchronized with the leading AC waveform. All inverters work together to regulate the AC voltage within the rated AC output voltage for the type 1 AC loads in off-grid circuit 1. Now, all inverters work in off-grid mode 1.

(3) When the off-grid circuit 1 is disconnected, all inverters will stop generating power. The master inverter will send a test signal through its output port 164, AC powerline 181, and the output port 175 of the last slave inverter 171 to check the off-grid circuit 2. If there is no AC present and an AC load is detected, the master inverter 160 will start to generate AC to power the load in the off-grid circuit 2. When the slave inverters 170 and 171 see a leading AC waveform, they will start to generate AC power which is synchronized with the leading AC waveform. All inverters work together to regulate the AC voltage within the rated AC output voltage for the type 2 AC loads in off-grid circuit 2. Now, all inverters work in off-grid mode 2.

(4) When the off-grid circuit 2 is disconnected, all inverters will stop generating power and the master inverter will go back and send a test signal to check the off-grid circuit 1. If there is no AC present and an AC load is detected, all inverters will start to generate AC to power the type 1 load again. Now, all inverters work in off-grid mode 1. Otherwise, the master inverter will go back and check the circuit 2 and so on.

(5) If both off-grid circuits 1 and 2 do not meet the power generation requirements, the inverters will not generate power and the master inverter will continue to check the status for both off-grid circuits.

To summarize, FIG. 5 shows how multiple dual-output off-grid power inverters can daisy-chain to form a group to support a larger microgrid, which is ideal for off-grid AC Level 1 and Level 2 EV charging.

Figure 6:
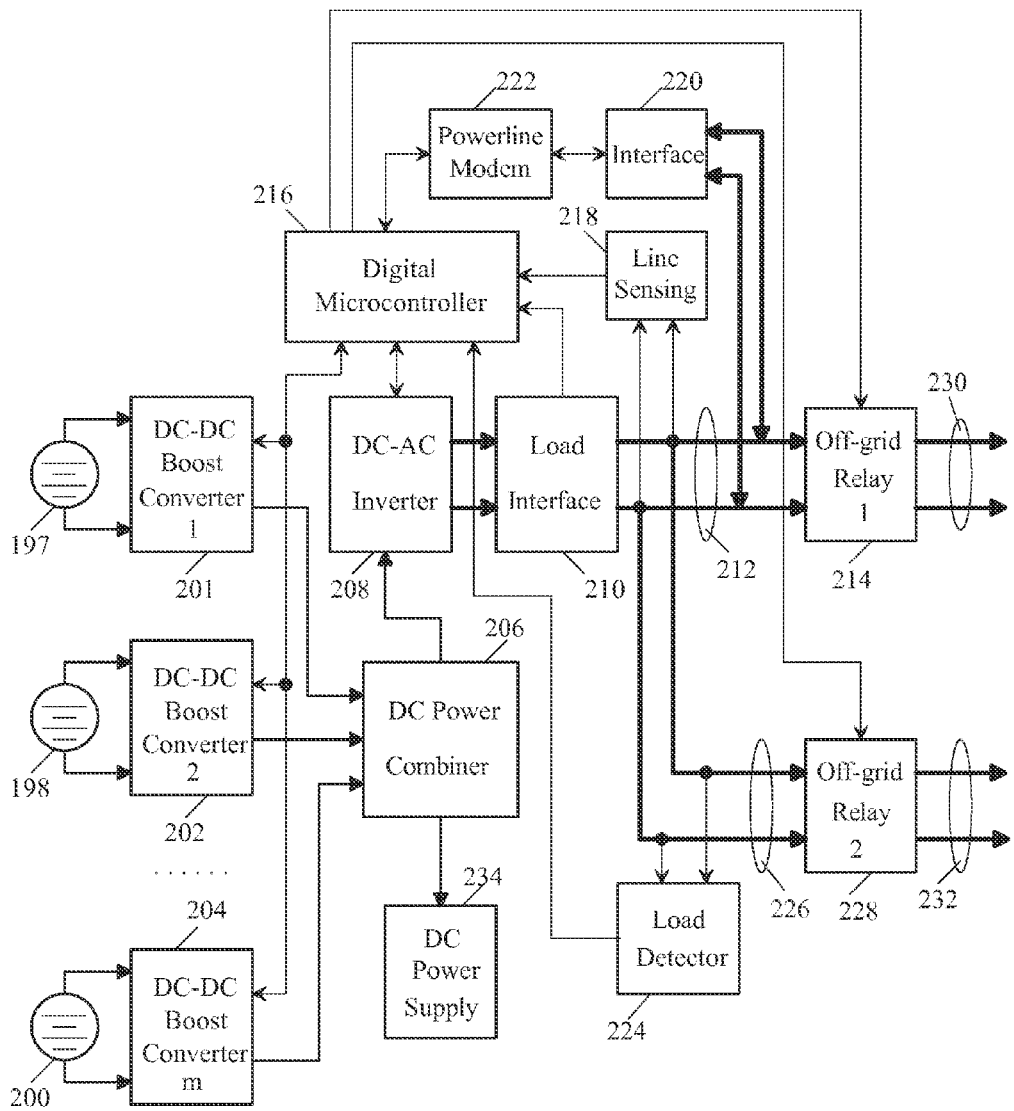
FIG. 6 is a block diagram illustrating a m-channel dual-output off-grid power inverter that is connected to m DC sources and has two AC output ports, according to an embodiment of this invention.

FIG. 6 is a block diagram illustrating a m-channel dual-output off-grid power inverter that is connected to m DC sources and has two AC output ports, according to an embodiment of this invention.

The inverter comprises m DC-DC boost converters 201, 202, ..., 204, a DC power combiner 206, a DC-AC inverter 208, a load interface circuit 210, an internal off-grid AC powerline 212, an off-grid electric relay 214, a digital microcontroller 216, a line sensing circuit 218, an interface circuit for powerline communications 220, a powerline communications Modem 222, a load detector 224, an internal off-grid AC powerline 226, an off-grid electric relay 228, an external off-grid AC powerline 230, an external off-grid AC powerline 232, and a DC power supply 234. The external off-grid AC powerline 230 is connected to an off-grid circuit 1 for type 1 AC loads, and the external off-grid AC powerline 232 is connected to an off-grid circuit 2 for type 2 AC loads.

The off-grid electric relay 214 controlled by the microcontroller 216 is used to isolate the internal AC powerline 212 from the external AC powerline 230. The off-grid electric relay 228 controlled by the microcontroller 216 is used to isolate the internal AC powerline 226 from the external AC powerline 232. The internal off-grid AC powerlines 212 and 226 are connected. However, the AC voltage on the internal powerline 212 and 226 is dependent on whether the inverter is running in the off-grid mode 1 or 2.

The line sensing circuit 218 connected to the AC powerline 212 and 226 is used to detect if there is AC power on the powerline 230 and 232. For a dual-output off-grid master inverter, it will not generate power if AC is detected on the powerline. This could happen if someone connects the off-grid inverter to the grid. For a dual-output off-grid slave inverter, it has to detect a leading AC signal on the powerline supplied by the master inverter before it can generate power. The line sensing circuit 218 is also used to measure the AC output voltage and current as real-time feedback signals for the inverter to regulate the AC output voltage. The line sensing circuit 268 in FIG. 7 and line sensing circuit 318 in FIG. 8 perform the similar functions.

During normal operating conditions, the power from DC sources 197, 198, ..., 200 is delivered to the corresponding DC-DC boost converters 201, 202, ..., 204 respectively. The DC power is then combined in the DC power combiner 206. The combined DC power is then inverted by the DC-AC inverter 208 to AC power. In off-grid mode 1, the electric relay 214 is closed and electric relay 228 is open. The generated AC power is sent to type 1 AC loads through the external AC powerline 230. In off-grid mode 2, the electric relay 214 is open and electric relay 228 is closed. The generated AC power is sent to type 2 AC loads through the external AC powerline 232. The AC output voltage is regulated based on inverter's rated output voltage for type 1 and type 2 AC loads, respectively. For instance, the rated voltage is 240V for type 1 AC loads and 120V for type 2 AC loads.

In the embodiments herein, the function of regulating AC output voltage is achieved by the microcontroller with its supporting circuits and software to perform the following: (1) measuring the AC output voltage in real-time; (2) comparing it with the rated AC output voltage setpoint such as 120V; and (3) adjusting the AC output current or output power until the output voltage is regulated around its setpoint within a specified deadband. More specifically, if the AC output voltage is higher than its setpoint, the microcontroller will reduce the output current by decreasing the duty-cycle of the pulse-width-modulation (PWM) of the DC converter. If the AC output voltage is lower than its setpoint, it will increase the duty-cycle of PWM to increase the AC output current. If the AC output voltage is within the deadband of its setpoint such as 120V+/−1V, the microcontroller will not make PWM duty-cycle adjustments to keep the AC output current and AC output power stable. Based on the Ohm's Law, the AC output voltage is in proportion of the AC output current so that it can be regulated accordingly.

Figure 7:
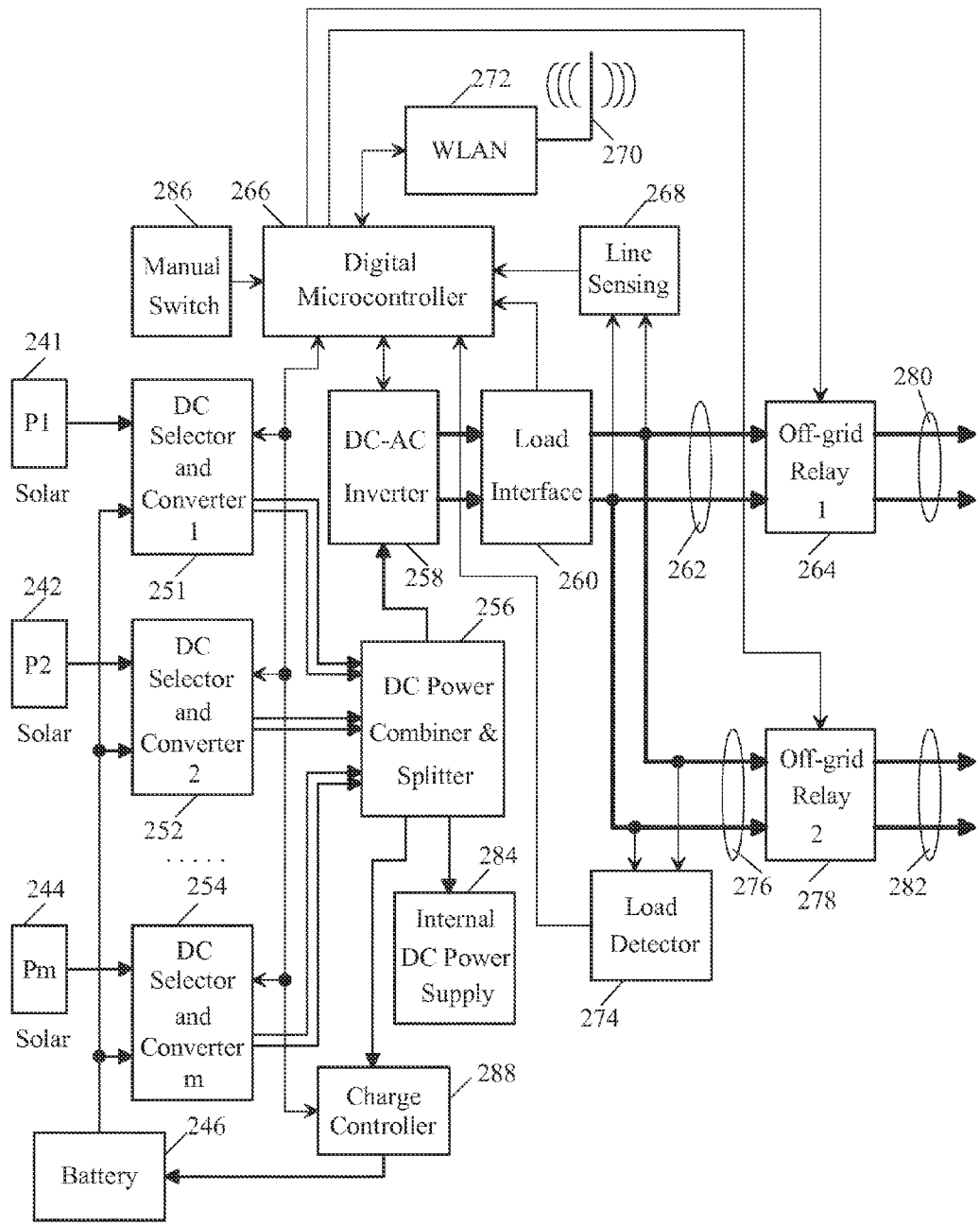
FIG. 7 is a block diagram illustrating a smart m+1 channel dual-output off-grid DC source flexible power inverter that is connected to m solar panels and a battery set through corresponding DC input channels, and has two AC output ports, according to an embodiment of this invention.
Figure 8:
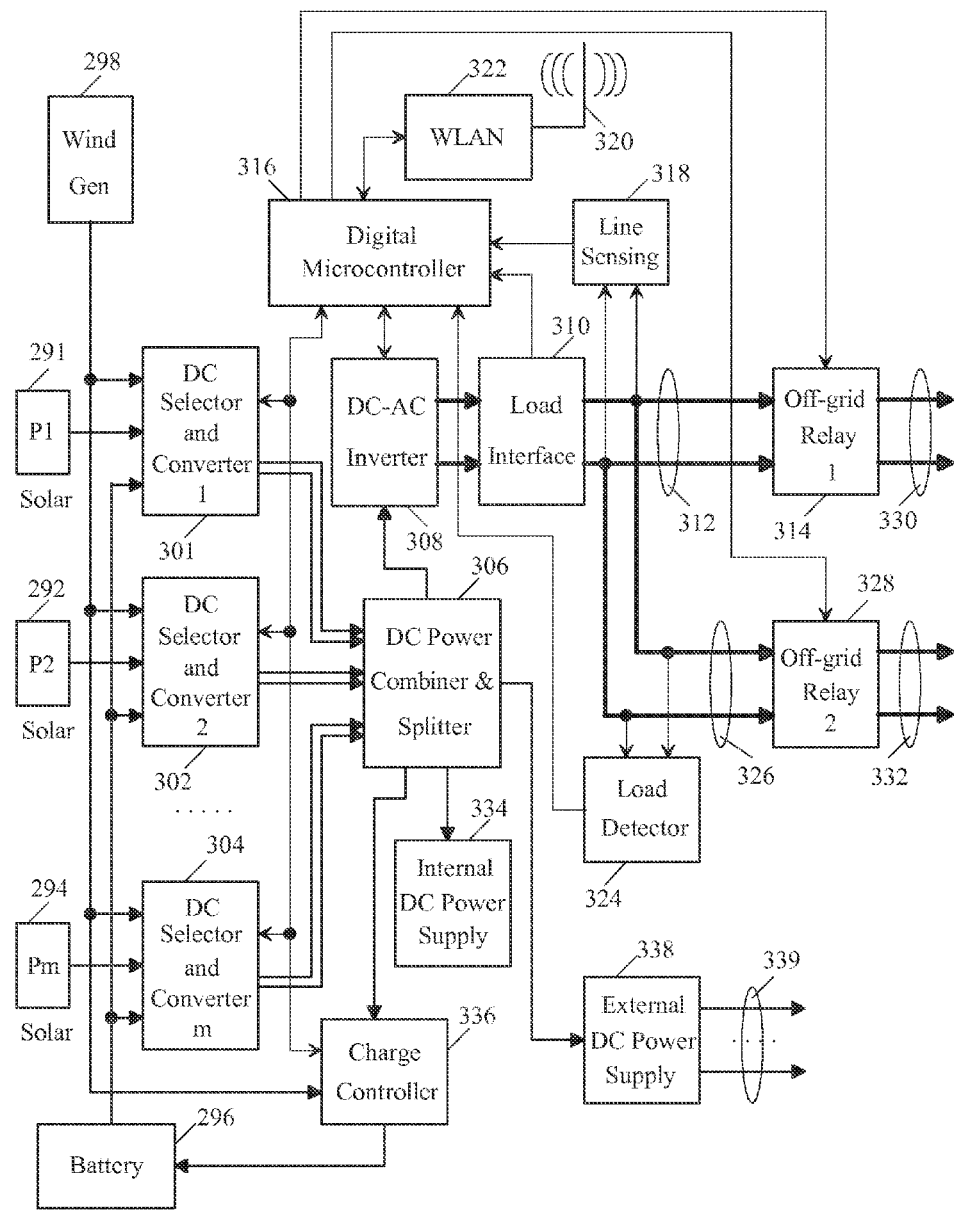
FIG. 8 is a block diagram illustrating a m+2 channel dual-output DC source flexible on-grid power inverter that is connected to m solar panels, a battery set, and a wind generator through corresponding DC input channels, and has two AC output ports, according to an embodiment of this invention.

The digital microcontroller 216 as well as those described in FIGS. 7 to 8 are small computers on a single integrated circuit (IC) or a set of ICs that consists of a central processing unit (CPU) combined with functions and peripherals including a crystal oscillator, timers, watchdog, serial and analog I/Os, memory modules, pulse-width-modulation (PWM) generators, and user software programs. A 32-bit high-performance floating-point microcontroller is selected for this application.

The AC power and related AC loads in the embodiments herein can be single-phase, split-phase, or 3-phase. The 2 AC wires in the drawing are there to show the concept and method.

The load detector 224 as well as the ones to be described in FIGS. 7 and 8 are electronic circuits that can detect the impedance of the connected AC load. If no AC power is detected on the external off-grid AC powerline 230 or 232, the load detector checks the impedance of the corresponding off-grid AC powerline to determine if the connected AC load is within certain specifications. The load detector in the embodiments herein can be designed using standard LRC meter impedance measurement circuits and mechanism such as those described in the book, "The Measurement of Lumped Parameter Impedance: A Metrology Guide" published by University of Michigan Library in January 1974.

The powerline communications Modem 222 which is isolated by an interface circuit 220 is used to establish a 2-way digital signal communication between the microcontroller and the outside world through the AC powerline. The Powerline Modem that can be used in the embodiments herein can be any of a number of commercially available integrated circuits capable of providing 2-way digital communications through a powerline.

FIG. 7 is a block diagram illustrating a smart m+1 channel dual-output off-grid DC source flexible power inverter that is connected to m solar panels and a battery set through corresponding DC input channels, and has two AC output ports, according to an embodiment of this invention.

The inverter comprises m DC selector and converter circuits 251, 252, . . . , 254, a DC power combiner and splitter 256, a DC-AC inverter 258, a load interface circuit 260, an internal off-grid AC powerline 262, an off-grid electric relay 264, a digital microcontroller 266, a line sensing circuit 268, an antenna for wireless communications 270, a wireless LAN (local area network) module 272, a load detector 274, an internal off-grid AC powerline 276, an off-grid electric relay 278, an external off-grid AC powerline 280, an external off-grid AC powerline 282, an internal DC power supply 284, a 3-position manual switch 286, and a charge controller 288. The external off-grid AC powerline 280 is connected to type 1 AC loads, and the external off-grid AC powerline 282 is connected to type 2 AC loads, respectively. Notice that this m+1 channel power inverter has a battery input channel.

During normal operating conditions, the power from solar panels 241, 242, . . . , 244 is delivered to the corresponding DC selector and converter 251, 252, . . . , 254 respectively. The power from battery 246 can enter the DC selector and converter 251, 252, . . . , 254 simultaneously as its DC output is connected to each of the converters in parallel.

Each DC selector and converter 251, 252, . . . , 254 is controlled by the digital microcontroller 266 and can select one or more DC sources from solar and battery depending on the DC selection criteria implemented in the software in the digital microcontroller. Each DC selector and converter can pull power from the selected DC sources and combine the power. It then splits the DC power into a high-voltage (HV) output and a low-voltage (LV) output. These 2 outputs are connected to the DC power combiner and splitter 256 as illustrated by the 2 lines in FIG. 7.

In the embodiments herein, the DC selector and converter, the DC power combiner and splitter, and charge controller have been described in the U.S. patent application No. 62/109,427.

The 3-position manual switch 286 is used to select the power inverter to work in the following positions: (1) auto position, (2) off-grid mode 1, and (3) off-grid mode 2. In the auto position, the microcontroller can switch between the off-grid mode 1 and 2 automatically based on a "first come, first serve" basis. That is, the inverter will try to supply power to off-grid circuit 1 to run type 1 AC loads first. If there is no type 1 AC loads or the off-grid circuit 1 is open, the inverter will try to supply power to off-grid circuit 2 to run type 2 AC loads. The inverter will switch back and forth automatically once a corresponding off-grid circuit does not meet the operating conditions. When the switch is in the off-grid mode 1 position, the inverter will work as a single-output off-grid inverter to supply power to off-grid circuit 1 only. When the switch is in the off-grid mode 2 position, the inverter will work as a single-output off-grid inverter to supply power to off-grid circuit 2 only.

The 3-position manual switch 286 is connected to the microcontroller 266 through signal lines to inform the microcontroller of the selected position. For example, the system can be designed to use 0V, 2.5V, and 3.3V DC signals to switch among the (1) auto position, (2) off-grid mode 1, and (3) off-grid mode 2, respectively.

The DC selectors that can be used in the embodiments herein are any of a number of electric devices to connect and disconnect electric circuits including but not limited to electric relays, contacts, and solid-state switches. The DC converters that can be used in the embodiments herein are any of a number of well known converters described in the "Power Electronics Handbook" edited by Muhammad H. Rashid and published by Academic Press in 2007, the entirety of which is hereby incorporated by reference, including Buck Converter, Boost Converter, Buck-Boost Converter, Super-Lift Luo Converter, and Cascade Boost Converter. The DC-AC inverters that can be used in the embodiments herein are any of a number of well known DC-AC inverters described in the "Power Electronics Handbook" including Half-Bridge Inverter, Full-Bridge Inverter, Bipolar PWM Inverter, Unipolar PWM Inverter, and Sinusoidal PWM Inverter. The DC combiner used in the embodiments herein can be designed with a circuit that allows the HV outputs and LV outputs from all DC converters to connect in parallel, respectively, so that all related DC currents are added together. The DC splitter used in the embodiments herein can be designed to split and distribute the DC power to the internal and external power supplies as well as the charge controller.

The wireless LAN module that can be used in the embodiments herein can be any of a number of commercially available integrated circuits capable of providing 2-way digital communications through wireless networks. Other modules discussed in the embodiments herein including load interface, solid state switch, line sensing circuit, powerline interface circuit, load detector, on-grid relay, off-grid relay, internal DC power supply, external DC power supply, and battery charge controller can be implemented using one or more known combinations of conventional electronic components such as resisters, capacitors, inductors, sensing circuits, solid-state switches, transformers, diodes, transistors, operational amplifiers, ceramic filters, and integrated circuits (ICs), etc.

FIG. 8 is a block diagram illustrating a m+2 channel dual-output DC source flexible on-grid power inverter that is connected to m solar panels, a battery set, and a wind generator through corresponding DC input channels, and has two AC output ports, according to an embodiment of this invention.

The inverter comprises m DC selector and converter circuits 301, 302, . . . , 304, a DC power combiner and splitter 306, a DC-AC inverter 308, a load interface circuit 310, internal off-grid AC powerlines 312 and 326, off-grid relays 314 and 328, a digital microcontroller 316, a line sensing circuit 318, an antenna for wireless communications 320, a wireless LAN module 322, a load detector 324, external off-grid AC powerlines 330 and 332, an internal DC power supply 334, a charge controller 336, and an external DC power supply 338 connected to a DC circuit 339. The external DC power supply 338 can supply DC power to one or multiple DC loads through the DC output circuits 339.

During normal operating conditions, the power from solar panels 291, 292, . . . , 294 is delivered to the corresponding DC selector and converter 301, 302, . . . , 304 respectively. The power from wind generator 298 can enter the DC selector and converter 301, 302, . . . , 304 simultaneously as the wind generator's DC output is connected to each of the converters in parallel. The power from battery 296 can also enter the DC selector and converter 301, 302, . . . , 304 simultaneously as its DC output is connected to each of the converters in parallel.

Each DC selector and converter 301, 302, . . . , 304 is controlled by the digital microcontroller 316 and can select one or more DC sources from solar, wind, and battery depending on the DC selection criteria implemented in the software running in the digital microcontroller. Each DC selector and converter can pull power from the selected DC sources and combine the power. It then splits the DC power into a high-voltage (HV) output and a low-voltage (LV) output. These 2 outputs are connected to the DC power combiner and splitter 306 as illustrated by the 2 lines in FIG. 8.

The digital microcontroller 316 is used to perform a number of tasks including: (1) monitoring the DC input voltage from solar, wind, and battery; (2) selecting the DC sources based on the DC source selection criteria; (3) monitoring the DC voltages in each of the DC selector and converter circuits; (4) controlling the outputs of each of the DC selector and converter circuits; (5) measuring the input voltage and current, and calculating DC input power for each input channel; (6) performing maximum power point tracking (MPPT) for each solar panel; (7) performing DC-AC inversion, AC power synchronization, and AC output current control; (8) monitoring AC current and voltage for generated power amount and status; (9) performing wireless communications; (10) performing logic controls such as AC powerline switching and isolation; (11) detecting off-grid AC circuit status; (12) switching between off-grid mode 1 and 2 depending on the condition of the off-grid circuits and connected loads; and (13) regulating AC output voltage. The digital microcontroller described in FIGS. 6 and 7 works very similarly.

Since this is an off-grid DC source flexible power inverter that has both AC and DC outputs to run connected AC and DC loads, the DC selection and power pulling criteria can be designed to include the following functions: (1) pull all available DC power from the wind generator and use only a portion of the solar energy needed to run the AC and DC loads, since it is easier to pull more or less power from solar panels to achieve rapid load balancing; (2) if additional DC power is needed to run the AC and DC loads, pull power from the solar panels; (3) if required, pull all available DC power from all solar panels at its maximum power point (MPP); (4) when the sun and wind cannot supply sufficient DC power for the inverter to run the AC and DC loads, pull power from the battery set; (5) charge the battery if there is excess DC power from the solar panels and/or wind generator; (6) charge the battery using DC power directly from the wind generator; and (7) when sufficient DC power is available from solar panels and wind generator, gradually stop pulling power from the battery set.

Since the disclosed dual-output DC source flexible power inverters are used for solar and wind power applications, the available DC input power from each input channel will vary due to sunlight and wind speed variations. On the other hand, the total AC loads may change quickly and frequently. The automatic control system to regulate the inverter's output voltage for off-grid applications can be difficult to implement. The Model-Free Adaptive (MFA) controllers described in U.S. Pat. Nos. 6,055,524, 6,556,980, 7,142,626, 7,152,052, 7,415,446 and 8,594,813, the contents of all of which are hereby incorporated by reference, are implemented in the microcontroller to achieve robust control performance for AC output voltage regulation.

In the embodiments herein, the function of regulating DC output voltages is achieved by the digital microcontroller with its supporting circuits and software. The useful DC outputs may include the following: (1) 5V DC for small devices and phone chargers, (2) 12V DC for shop tools, and (3) 24V DC for instruments.

FIG. 9 is a block diagram illustrating a dual-output off-grid power inverter's output port 1 to supply power to single-phase type 1 AC loads, and output port 2 to supply power to single-phase type 2 AC loads, according to an embodiment of this invention.

In North America and some other parts of the world, split-phase AC standard is used. A split-phase system is also called single-phase three-wire system for electric power distribution. Originated from Thomas Edison's three-wire DC system, the split-phase AC system has some advantages over the single-ended single-phase AC system. For the split-phase system, as an example, the line-to-line (L1 to L2) output voltage is 240V, and the Line-to-Neutral (L1 to N, or L2 to N) is 120V. Therefore, there are two types of AC loads in North America, where type 1 is 240V, 60 Hz and type 2 is 120V, 60 Hz. A microgrid used in North America may need to support both types of AC loads.

In FIG. 9, the inverter's AC output port 340 comprises an electric relay 342, a control circuit 344, an internal AC powerline 346, and an external AC powerline 348. The inverter's off-grid AC output port 350 comprises an electric relay 352, a control circuit 354, an internal AC powerline 356, and an external AC powerline 358. The external on-grid AC powerline 348 is connected to a single-phase off-grid circuit 1 for type 1 AC loads, and the external off-grid AC powerline 358 is connected to a single-phase off-grid circuit 2 for type 2 AC loads. The control circuits 344 and 354 are connected to and controlled by a digital microcontroller described in FIGS. 6 to 8. When the inverter works in off-grid mode 1, the produced AC power is delivered through the AC powerline 346 and 348. When the inverter works in off-grid mode 2, the produced AC power is delivered through the AC powerline 356 and 358.

The electric relays 342 and 352 as well as those to be described in FIGS. 10 and 12 are any of a number of electric devices to connect and disconnect electric circuits including but not limited to electric relays, contacts, solid-state switches, and TRIAC (bidirectional triode thyristor or bilateral triode thyristor).

The control circuits 344 and 354 as well as those to be described in FIGS. 10 and 11 convert the digital control signals to appropriate AC or DC signals that can drive the electric relays or the other types of electric connecting and disconnecting devices such as contacts, solid-state switches, and TRIAC.

Without losing generality, the output ports in FIG. 9 and the ones to be described in FIGS. 10 and 11 can be designed to work in the following ways:

(1) When the inverter starts, the electric relay 342 is closed and electric relay 352 is open. The inverter will send a test signal to check the off-grid circuit 1. If there is no AC present and an AC load is detected, it will start to generate AC to power the type 1 AC loads. Now, the inverter is working in off-grid mode 1.

(2) When the off-grid circuit 1 is disconnected, the inverter will stop generating power and open the electric relay 342 and close the relay 352. It will then send a test signal to check the off-grid circuit 2. If there is no AC present and an AC load is detected, it will start to generate AC to power the type 2 AC loads. Now, the inverter is working in off-grid mode 2.

(3) When the off-grid circuit 2 is disconnected, the inverter will stop generating power and open the electric relay 352 and close the relay 342. It will then send a test signal to check the off-grid circuit 1. If there is no AC present and an AC load is detected, it will start to generate AC to power the type 1 load again. Now, the inverter is working in off-grid mode 1. Otherwise, it will go back and check the circuit 2 and so on.

(4) If both off-grid circuits 1 and 2 do not meet the power generation requirements, the inverter will not generate power but will continue to check the status of both off-grid circuits.

FIG. 10 is a block diagram illustrating a dual-output off-grid power inverter's output port 1 to supply power to three-phase type 1 AC loads, and output port 2 to supply power to three-phase type 2 AC loads, according to an embodiment of this invention.

In FIG. 10, the inverter's AC output port 360 comprises a three-phase electric relay 362, a control circuit 364, an internal AC powerline 366, and an external AC powerline 368. The inverter's AC output port 370 comprises a three-phase electric relay 372, a control circuit 374, an internal AC powerline 376, and an external AC powerline 378. The external AC powerline 368 is connected to a three-phase off-grid circuit 1, and the external off-grid AC powerline 378 is connected to a three-phase off-grid AC circuit 2. The Neutral line of the three-phase off-grid AC circuits 1 and 2 is connected to the earth ground 379. The control circuits 364 and 374 are connected to and controlled by a digital microcontroller.

Compared with the output ports and off-grid circuits in FIG. 9, this is a more complex case since the off-grid circuits and AC loads are three-phase. However, the logic to switch between the two output ports to power type 1 and 2 AC loads is very similar to that described in FIG. 9.

FIG. 11 is a block diagram illustrating a dual-output off-grid power inverter's output port 1 to supply power to single-phase AC loads, and output port 2 to supply power to three-phase AC loads, according to an embodiment of this invention.

In FIG. 11, the inverter's AC output port 380 comprises a three-phase electric relay 382, a control circuit 384, an internal AC powerline 386, and an external AC powerline 388. The inverter's AC output port 390 comprises a single-phase electric relay 392, a control circuit 394, an internal AC powerline 396, and an external AC powerline 398. The external AC powerline 388 is connected to a three-phase off-grid circuit, and the external off-grid AC powerline 398 is connected to a single-phase off-grid AC circuit. The Neutral line of the three-phase off-grid AC circuit and the Common line of the single-phase off-grid AC circuit is connected to the earth ground 399. The control circuits 384 and 394 are connected to and controlled by a digital microcontroller.

Compared with the output ports and off-grid circuits in FIGS. 9 and 10, the output ports in FIG. 11 supports a three-phase off-grid circuit for three-phase AC loads when working in off-grid mode 1 and supports a single-phase off-grid circuit for single-phase AC loads when working in off-grid mode 2. In this case, the type 1 AC loads are three-phase and type 2 AC loads are single-phase.

FIG. 12 is a block diagram illustrating the output ports of a dual-output off-grid master inverter and slave inverter, where the two inverters daisy-chain through their corresponding output ports to form a group and supply power to an off-grid AC circuit 1 or an off-grid AC circuit 2, according to an embodiment of this invention.

In FIG. 12, a dual-output off-grid master inverter 402 comprises an electric relay 404, an internal AC powerline 408, and an external AC powerline 410 to form its output port 1 for type 1 AC loads. The inverter also comprises an electric relay 406, an internal AC powerline 412, and an external AC powerline 414 to form its output port 2 for type 2 AC loads. A dual-output off-grid slave inverter 422 comprises an electric relay 424, an internal AC powerline 428, and an external AC powerline 430 to form its output port 1 for type 1 AC loads. The inverter also comprises an electric relay 426, an internal AC powerline 432, and an external AC powerline 434 to form its output port 2 for type 2 AC loads. The control circuits of the output ports described in FIGS. 9 to 11 are not shown in FIG. 12 to simplify the drawing.

The master and slave inverters can daisy-chain by connecting the output port 2 of the master inverter to the output port 1 of the slave inverter using appropriate AC connectors 416 and 418. Although we say the inverters daisy chain, the actual connection of the AC wires is in parallel so that the generated AC power from each power inverter is added in parallel onto the AC powerline.

In FIG. 4, we described how a dual-output master inverter and a dual-output slave inverter can be arranged to work together. In FIG. 12, the actual design is described in more details in the following:

(1) When there is sufficient DC input power, the master inverter 402 will start and close relay 406 and slave inverter 422 will start and close relay 424. These relays stay closed so that the master and slave inverters are connected through the AC powerlines to become one operating unit. The inverters can also communicate through the connected AC powerlines via powerline communication as described in FIG. 6. If the powerline communication is not implemented in the inverters, they can communicate via wireless LAN as described in FIGS. 7 and 8.

(2) The master inverter will close relay 404 and inform the slave inverter to open relay 426. When the slave inverter receives the message from the master inverter, it will open relay 426 and then send a confirmation message back to the master inverter.

(3) After receiving the confirmation message of relay 426 being open, the master inverter will send a test signal through powerline 408 and 410 to check the off-grid circuit 1 for type 1 AC loads. If there is no AC present and an AC load is detected, it will start to generate AC to power the load and inform the slave inverter to run in off-grid mode 1.

(4) When the slave inverter sees the "running in off-grid mode 1" message from the master inverter, it will check if there is a leading AC waveform in the powerline. If yes, it will start to generate power and the generated AC is synchronized with the leading AC waveform. Both inverters work together to regulate the AC voltage within the rated AC output voltage for the type 1 AC loads in off-grid circuit 1. Now, both inverters work in off-grid mode 1.

(5) When the off-grid circuit 1 is disconnected, both inverters will stop generating power. The master inverter will open relay 404 and inform the slave inverter to close relay 426. When the slave inverter receives the message, it will close relay 426 and then send a confirmation message back to the master inverter.

(6) After receiving the confirmation message of relay 426 being closed, the master inverter will send a test signal through powerlines 412, 414, 430, 428, 432, and 434 to check the off-grid circuit 2 for type 2 AC loads. If there is no AC present and an AC load is detected, it will start to generate AC to power the load and also inform the slave inverter to run in off-grid mode 2.

(7) When the slave inverter sees the "running in off-grid mode 2" message from the master inverter, it will check if there is a leading AC waveform in the powerline. If yes, it will start to generate power and the generated AC is synchronized with the leading AC waveform. Both inverters work together to regulate the AC voltage within the rated AC output voltage for the type 2 AC loads in off-grid circuit 2. Now, both inverters work in off-grid mode 2.

(8) When the off-grid circuit 2 is disconnected, both inverters will stop generating power. The master inverter will close relay 404 and inform the slave inverter to open relay 426. When the slave inverter receives the message, it will open relay 426 and then send a confirmation message back to the master inverter.

(9) The master inverter will execute the tasks in step (3) and then both inverters will work according to steps (4) to (8) and so on.

(10) If both off-grid circuits 1 and 2 do not meet the power generation requirements, the inverters will not generate power and the master inverter will continue to check the status for both off-grid circuits.

Although FIG. 12 shows how one dual-output master inverter and one dual-output slave inverter can work together, the design to allow one dual-output master inverter and multiple dual-output slave inverters can be done in similar ways. In this case, the master inverter communicates with multiple slave inverters and informs the corresponding slave inverters to open or close certain relays according to the status of the off-grid circuits and inverter operating modes.

In the embodiments herein, if the inverters do not include powerline or wireless LAN communication mechanisms, the inverters can still communicate among themselves by using a pair of wires to transfer analog or digital signals. This means, the master inverter can still communicate with one or multiple slave inverters to work as a group to perform the functions described.

The applying organization of this patent has built commercial 4-channel on-grid power inverters for on-grid applications, 4-channel off-grid power inverters for off-grid applications, and 4-channel on/off-grid power inverters for applications where grid power is not stable. The described smart microgrid and supporting dual-output off-grid DC source flexible power inverters enhanced the unique design and concept of multi-channel power inverters.

Studies show about 3 billion people in the world still cook food and heat their homes with outdated stoves fueled by wood or coal fires, which accounts for a large percentage of the greenhouse gases that are polluting our planet. Solar cooking is a clean way to cook that requires only sunshine as fuel. A smart microgrid supported by a multi-channel dual-output off-grid power inverter with several solar panels can power an electric hot plate for solar cooking in its off-grid mode 1, and then power lights, fans, phone chargers, and even a small refrigerator in its off-grid mode 2. The system can be affordable and very useful for people living in rural parts of the world.

Compared with traditional off-grid solar systems, the described smart microgrid has many features and benefits including: (1) no batteries needed, (2) panel level MPPT to solve partial shading problems and maximize solar power production, (3) no high voltage or high current DC so the system is intrinsically safe, (4) easier to install and maintain, (5) able to run different types of AC loads with dual outputs in a flexible way, (6) able to provide DC power to multiple DC loads, (7) able to build larger microgrids with multiple inverters, and (8) more cost-effective. The innovative smart microgrid is ideal for any area where reliable electricity is not available.

A good application for the disclosed smart microgrid is off-grid electric vehicle (EV) charging. Based on the SAE J1772 standard, a Level 1 EV charger requires 120V AC power and a Level 2 EV charger requires 240 AC power, respectively. The smart microgrid enabled by multi-channel off-grid dual-output DC source flexible power inverters can support both Level 1 and Level 2 EV charging with two off-grid AC circuits. The smart microgrid is ideal for off-grid EV charging systems in workplace parking lots, shopping centers, sports arenas, parks and recreation areas, transportation parking lots, and any where grid power is not conveniently available or cost-effective.

The invention claimed is:
1. A dual-output off-grid power inverter, comprising:
 a) one or multiple DC input ports;
 b) an AC output port 1 connected to an off-grid AC circuit 1 and arranged to supply AC power to type 1 AC loads when working in off-grid mode 1;

c) an AC output port 2 connected to an off-grid AC circuit 2 and arranged to supply AC power to type 2 AC loads when working in off-grid mode 2; and d) a DC-AC inverter constructed and arranged to receive DC power from the one or multiple DC input ports, invert the DC power to AC power, and supply AC power through said AC output port 1 for type 1 AC loads or AC output port 2 for type 2 AC loads.

2. The inverter of claim 1, in which the DC input ports are arranged to connect to multiple DC sources including at least one photovoltaic solar panel, at least one wind generator, or at least one battery, or any combination thereof, whereby the said inverter can pull power from the connected DC sources based on pre-defined DC source selection criteria.

3. The inverter of claim 1, further comprising:
a) a DC power supply coupled to the one or multiple DC input ports; and
b) one or multiple DC output ports coupled to the DC power supply to supply DC power to DC loads.

4. The inverter of claim 1, in which the output of the dual-output off-grid power inverter is single-phase AC or three-phase AC.

5. The inverter of claim 1, further comprising:
a) for each AC output port, an internal AC powerline that allows the generated AC power to be sent to corresponding AC loads through an external AC powerline;
b) for each AC output port, an electric relay arranged to isolate the internal AC powerline from the external AC powerline;
c) for each DC input port, a DC-DC boost converter arranged to convert the voltage of a DC power source to a higher DC voltage suitable for inversion;
d) a DC power combiner connected to the DC-DC boost converters for combining the DC output from all DC-DC boost converters and allowing the DC-DC boost converters to connect in parallel so that all DC currents are added together, the DC power combiner being connected to the DC-AC inverter;
e) a load interface circuit connected to the DC-AC inverter and to the internal AC powerlines, said load interface circuit being arranged to filter high-frequency components out of the DC-AC inverter's AC output;
f) a load detector connected to the internal and external AC powerlines, and arranged to detect the impedance of the connected AC loads;
g) a digital microcontroller connected to the DC-DC boost converters, DC-AC inverter, load interface circuit, electric relays of the AC output ports, and load detector, said microcontroller arranged to monitor the DC boost voltage, control the DC-DC boost converters, perform maximum power point tracking (MPPT), control DC-AC inversion, monitor AC output current and voltage, close or open electric relays of the AC output ports, perform powerline communications, check the impedance of the AC load to determine if it is within predetermined specifications, detect off-grid AC circuit status; switch between off-grid mode 1 and 2 depending on the condition of the off-grid circuits and connected loads, and regulate AC output voltage;
h) a powerline modem connected to the microcontroller and internal AC powerlines through an interface circuit arranged to establish a 2-way digital signal communication between the digital microcontroller and the outside world through the external AC powerline;
i) a line sensing circuit connected to the AC powerlines and the microcontroller, and arranged to detect if there is AC power on the powerlines, and measure the AC output voltage and current as real-time feedback signals for the inverter to regulate the AC output voltage; and
j) a power supply connected to said DC power combiner and arranged to supply DC power to the electronic components of the power inverter.

6. The inverter of claim 5, in which the digital microcontroller includes Model-Free Adaptive (MFA) controllers that control the DC-DC boost converters and regulate the AC output voltage, and MFA optimizers that provide maximum power point tracking (MPPT) to allow the power inverter to achieve optimal power production.

7. The inverter of claim 1, further comprising:
a) for each AC output port, an internal AC powerline that allows the generated AC power to be sent to corresponding AC loads through an external AC powerline;
b) for each AC output port, an electric relay arranged to isolate the internal AC powerline from the external AC powerline;
c) for each DC input port, a DC selector and converter arranged to select and pull power from one or more DC sources from solar, wind, or battery depending on pre-determined DC selection criteria and split the DC power into a high-voltage (HV) output and a low-voltage (LV) output;
d) a DC power combiner and splitter that combines the high-voltage (HV) and low-voltage (LV) DC power from the DC selector and converter of all DC input ports and supplies LV DC power to an internal DC power supply, an external DC power supply, and a battery charge controller, and supplies HV DC power to the DC-AC inverter;
e) a load interface circuit connected to the DC-AC inverter and to the internal AC powerlines, said load interface circuit being arranged to filter high-frequency components out of the DC-AC inverter's AC output;
f) a load detector connected to the internal and external AC powerlines, and arranged to detect the impedance of the connected AC loads;
g) a digital microcontroller connected to the DC selector and converter of all DC input ports, DC-AC inverter, load interface circuit, electric relays of the AC output ports, and load detector, said microcontroller arranged for (i) monitoring the DC input voltage from solar, wind, and battery; (ii) selecting the DC sources based on the DC source selection criteria; (iii) monitoring the DC voltages in each of the DC selector and converter circuits; (iv) controlling the outputs of each of the DC selector and converter circuits; (v) measuring the input voltage and current, and calculating DC input power for each input channel; (vi) performing maximum power point tracking (MPPT) for each solar panel; (vii) controlling DC-AC inversion, AC power synchronization, and AC output current; (viii) monitoring AC current and voltage for generated power amount and status; (ix) performing wireless communications; (x) performing logic controls such as AC powerline switching and isolation; (xi) detecting off-grid AC circuit status; (xii) switching between off-grid mode 1 and 2 depending on the condition of the off-grid circuits and connected loads; and (xiii) regulating AC output voltage;
h) an antenna for wireless communications and a wireless local area network (LAN) module connected to the microcontroller arranged to establish a 2-way digital signal communication between the digital microcontroller and the outside;

i) a line sensing circuit connected to the AC powerlines and the microcontroller, and arranged to detect if there is AC power on the powerlines, and measure the AC output voltage and current as real-time feedback signals for the inverter to regulate the AC output voltage;

j) an internal DC power supply connected to the DC power combiner and splitter arranged to supply DC power to the electronic components of the power inverter;

k) an external DC power supply connected to the DC power combiner and splitter arranged to supply DC power to one or multiple DC loads; and l) a charge controller that can take DC power from the DC power combiner and splitter or from a wind generator directly to charge batteries.

8. The inverter of claim 7, further comprising a 3-position manual switch arranged to select the power inverter to work in the following positions:
   (a) auto position, where the microcontroller can switch between the off-grid mode 1 and 2 automatically based on a "first come, first serve" basis;
   (b) off-grid mode 1, where the inverter works as a single-output off-grid inverter to supply power to type 1 AC loads in off-grid AC circuit 1; and
   (c) off-grid mode 2, where the inverter works as a single-output off-grid inverter to supply power to type 2 AC loads in off-grid AC circuit 2.

9. A system for providing AC power to an off-grid AC circuit 1 for type 1 loads or an off-grid AC circuit 2 for type 2 AC loads respectively from a plurality of individual DC power sources each having a DC output port, comprising:
   a) a plurality of dual-output off-grid power inverters, each having m DC input ports, where m is an integer greater than or equal to two, an AC output port 1, and an AC output port 2; and
   b) the AC output port 2 of each inverter being connected in a daisy chain to the AC output port 1 of the next inverter, except for the AC output port 1 of the first inverter being connected to the off-grid AC circuit 1 for type 1 AC loads, and the AC output port 2 of the last inverter being connected to the off-grid AC circuit 2 for type 2 AC loads.

10. The system of claim 9, in which one of the dual-output off-grid power inverters is a dual-output master inverter and others are dual-output slave inverters.

11. The system of claim 9, in which each of the power inverters comprising:
   a) for each AC output port, an internal AC powerline that allows the generated AC power to be sent to corresponding AC loads through an external AC powerline;
   b) for each AC output port, an electric relay arranged to isolate the internal AC powerline from the external AC powerline;
   c) for each DC input port, a DC selector and converter arranged to select and pull power from one or more DC sources from solar, wind, or battery depending on pre-determined DC selection criteria and split the DC power into a high-voltage (HV) output and a low-voltage (LV) output;
   d) a DC power combiner and splitter that combines the high-voltage (HV) and low-voltage (LV) DC power from the DC selector and converter of all DC input ports and supplies LV DC power to an internal DC power supply, an external DC power supply, and a battery charge controller, and supplies HV DC power to a DC-AC inverter;
   e) a DC-AC inverter connected to the DC power combiner and splitter and arranged to invert DC power to AC power;
   f) a load interface circuit connected to the DC-AC inverter and to the internal AC powerlines, said load interface circuit being arranged to filter high-frequency components out of the DC-AC inverter's AC output;
   g) a load detector connected to the internal and external AC powerlines, and arranged to detect the impedance of the connected AC loads;
   h) a digital microcontroller connected to the DC selector and converter of all DC input ports, DC-AC inverter, load interface circuit, electric relays of the AC output ports, and load detector, said microcontroller arranged for (i) monitoring the DC input voltage from solar, wind, and battery; (ii) selecting the DC sources based on the DC source selection criteria; (iii) monitoring the DC voltages in each of the DC selector and converter circuits; (iv) controlling the outputs of each of the DC selector and converter circuits; (v) measuring the input voltage and current, and calculating DC input power for each input channel; (vi) performing maximum power point tracking (MPPT) for each solar panel; (vii) controlling DC-AC inversion, AC power synchronization, and AC output current; (viii) monitoring AC current and voltage for generated power amount and status; (ix) performing wireless communications; (x) performing logic controls such as AC powerline switching and isolation; (xi) detecting off-grid AC circuit status; (xii) switching between off-grid mode 1 and 2 depending on the condition of the off-grid circuits and connected loads; and (xiii) regulating AC output voltage;
   i) an antenna for wireless communications and a wireless LAN (local area network) module connected to the microcontroller arranged to establish a 2-way digital signal communication between the digital microcontroller and the outside;
   j) a line sensing circuit connected to the AC powerlines and the microcontroller, and arranged to detect if there is AC power on the powerlines, and measure the AC output voltage and current as real-time feedback signals for the inverter to regulate the AC output voltage;
   k) an internal DC power supply connected to the DC power combiner and splitter arranged to supply DC power to the electronic components of the power inverter;
   l) an external DC power supply connected to the DC power combiner and splitter arranged to supply DC power to one or multiple DC loads; and
   m) a charge controller that can take DC power from the DC power combiner and splitter or from a wind generator directly to charge batteries.

12. The system of claim 9, in which the power inverters can communicate among themselves through powerline communications, wireless LAN, or a pair of wires to transfer analog or digital signals.

13. The system of claim 10, in which the dual-output master inverter communicates with one or multiple slave inverters and informs the corresponding slave inverters to open or close certain relays of their AC output ports so that the system can supply AC power to either off-grid AC circuit 1 for type 1 AC loads or off-grid AC circuit 2 for type 2 AC loads respectively.

14. A scalable DC to AC power inversion system for providing AC power to two off-grid AC circuits for type 1 or type 2 AC loads respectively from a plurality of individual DC power sources each having a DC output port, comprising:

a) a plurality of power inverters, each having at least one DC input port, an AC output port 1, and an AC output port 2;
b) the AC output port 2 of each inverter being connected in a daisy chain to the AC output port 1 of the next inverter, except for the AC output port 1 of the first inverter being connected to type 1 AC loads, and the AC output port 2 of the last inverter being connected to type 2 AC loads; and
c) whereby said system is incrementally scalable by adding or subtracting DC power sources and daisy-chained inverters.

15. The system of claim 14, in which the output of each said power inverter is single-phase AC or three-phase AC.

16. A method of making a DC to AC power conversion system incrementally scalable, comprising:

a) providing a plurality of DC power sources and a plurality of DC to AC power inverters, each having an AC output port 1, an AC output port 2, and at least one DC input port;
b) connecting at least one of said DC power sources, respectively, to at least one of said DC input ports;
c) providing AC power to type 1 AC loads through AC output port 1 or to type 2 AC loads through AC output port 2;
d) daisy-chaining at least two of said plurality of DC to AC power inverters, said AC output port 2 of each inverter being connected in a daisy chain to the AC output port 1 of the next inverter, except for the AC output port 1 of the first inverter being connected to type 1 AC loads, and the AC output port 2 of the last inverter being connected to type 2 AC loads; and
e) producing a total AC power that is a summation of the AC power supplied by each said inverter.

17. The method of claim 16, further comprising:
a) connecting the DC input ports to multiple DC sources including at least one photovoltaic solar panel, at least one wind generator, or at least one battery, or any combination thereof; and
b) pulling power from the connected DC sources based on pre-defined DC source selection criteria.

18. The method of claim 17, in which the DC source selection criteria comprising:
(a) maximizing the harvest of solar and wind energy and supply the converted AC power to power either type 1 or type 2 AC loads;
(b) providing sufficient AC power to run the connected AC loads without using battery power;
(c) when solar and wind cannot produce sufficient DC power for the system to run the connected AC loads, pulling power from said at least one battery to meet the power demand;
(d) charging said at least one battery when there is excess DC power from solar and wind; and
(e) pulling power from all DC sources to produce the AC power needed to start heavy loads such as compressors and motors.

19. The method of claim 16, in which the output of each said power inverter is single-phase AC or three-phase AC.

20. The method of claim 16, in which a type 1 AC load is an electric water heater or an electric heating element being heated with 100V-240V AC power, and the type 2 AC loads are electric devices that require 220V-240V, 50 Hz or 60 Hz AC power.

21. The method of claim 16, in which the type 1 AC loads are electric devices that require 110V-120V, 60 Hz AC power, and the type 2 AC loads are electric devices that require 220V-240V, 50 Hz AC power.

22. The method of claim 16, in which the type 1 AC loads are electric devices that require 110V-120V, 50 Hz AC power, and the type 2 AC loads are electric devices that require 220V-240V, 60 Hz AC power.

23. The method of claim 16, in which the type 1 AC loads are electric devices that require 110V-120V, 60 Hz AC power, and the type 2 AC loads are electric devices that require 220V-240V, 60 Hz AC power.

24. The method of claim 16, in which a type 1 AC load is an electric vehicle being charged with 120V, 60 Hz AC power, and a type 2 AC load is an electric vehicle being charged with 240V, 60 Hz AC power.

* * * * *